(12) United States Patent
Sturm

(10) Patent No.: US 9,149,927 B2
(45) Date of Patent: Oct. 6, 2015

(54) ROBOT ARRANGEMENT

(71) Applicant: KUKA Systems GmbH, Augsburg (DE)

(72) Inventor: Thomas Sturm, Wiedenzhausen (DE)

(73) Assignee: KUKA Systems GmbH, Augsburg (DE)

( * ) Notice: Subject to any disclaimer, the term of this patent is extended or adjusted under 35 U.S.C. 154(b) by 118 days.

(21) Appl. No.: 13/776,870

(22) Filed: Feb. 26, 2013

(65) Prior Publication Data

US 2013/0226341 A1 Aug. 29, 2013

(30) Foreign Application Priority Data

Feb. 27, 2012 (DE) .................. 20 2012 100 646 U

(51) Int. Cl.
*B25J 5/00* (2006.01)
*A61G 7/10* (2006.01)

(52) U.S. Cl.
CPC ............. *B25J 5/00* (2013.01); *A61G 7/1046* (2013.01); *B25J 5/007* (2013.01); *G05D 2201/0206* (2013.01); *G05D 2201/0211* (2013.01)

(58) Field of Classification Search
CPC ............. G05D 2201/0206; G05D 2201/0211; B25J 5/007; B25J 5/00; A61G 7/1046
USPC ................. 700/250, 253, 260; 901/1
See application file for complete search history.

(56) References Cited

U.S. PATENT DOCUMENTS

| 4,993,913 | A | | 2/1991 | Ohtsuki | |
|---|---|---|---|---|---|
| 5,318,254 | A | * | 6/1994 | Shaw et al. | 244/134 C |
| 5,490,646 | A | * | 2/1996 | Shaw et al. | 244/134 C |
| 5,858,111 | A | * | 1/1999 | Marrero | 134/6 |
| 6,477,730 | B1 | * | 11/2002 | Marrero | 15/53.1 |
| 6,675,068 | B1 | | 1/2004 | Kawasaki | |
| 2004/0093650 | A1 | * | 5/2004 | Martins et al. | 901/1 |
| 2004/0182960 | A1 | * | 9/2004 | Hach | 241/301 |
| 2005/0029029 | A1 | * | 2/2005 | Thorne | 180/167 |
| 2005/0126144 | A1 | * | 6/2005 | Koselka et al. | 56/10.2 R |
| 2008/0154538 | A1 | * | 6/2008 | Stathis | 702/152 |
| 2010/0106298 | A1 | * | 4/2010 | Hernandez et al. | 700/250 |
| 2011/0017030 | A1 | * | 1/2011 | Chambers | 83/13 |
| 2011/0137458 | A1 | * | 6/2011 | Hisatani et al. | 700/248 |
| 2012/0036676 | A9 | * | 2/2012 | Ota | 15/405 |

FOREIGN PATENT DOCUMENTS

| DE | 198 16 893 A1 | 11/1999 |
|---|---|---|
| DE | 199 18 272 A1 | 10/2000 |
| DE | 10 2004 016 345 A1 | 10/2005 |
| EP | 1 110 679 A1 | 6/2001 |

* cited by examiner

*Primary Examiner* — Jason Holloway
(74) *Attorney, Agent, or Firm* — McGlew and Tuttle, P.C.

(57) ABSTRACT

A robot arrangement has a movable, programmable robot (2), which has a plurality of links (4, 5, 6, 7) and axes of motion (I-VII) and is arranged on a movable, drivable carrying device (15). The robot arrangement (1) has a robot arrangement drive (16), which can be actuated by the robot (2), for the carrying means (15).

13 Claims, 16 Drawing Sheets

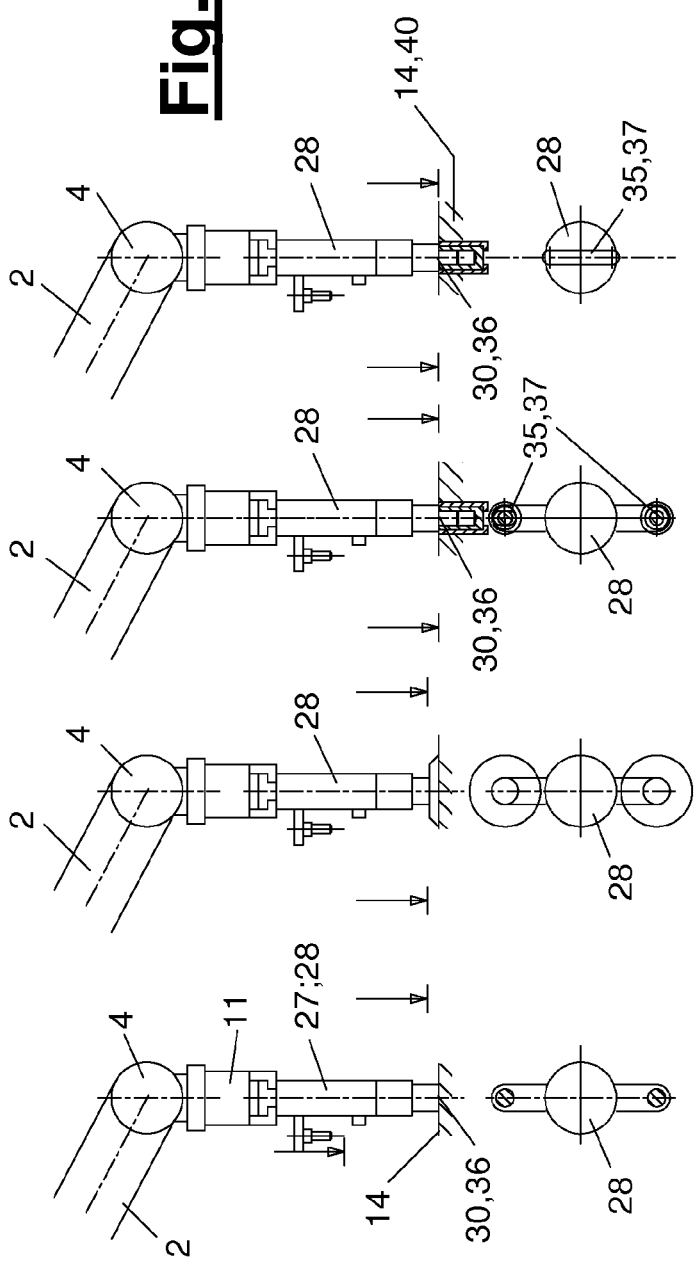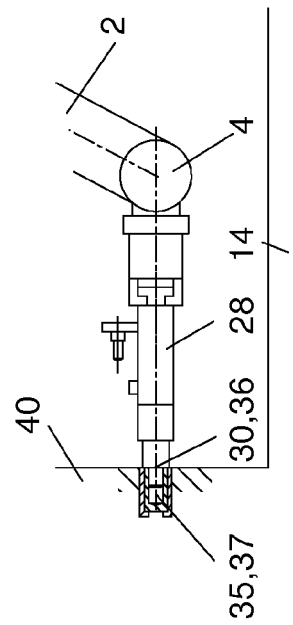

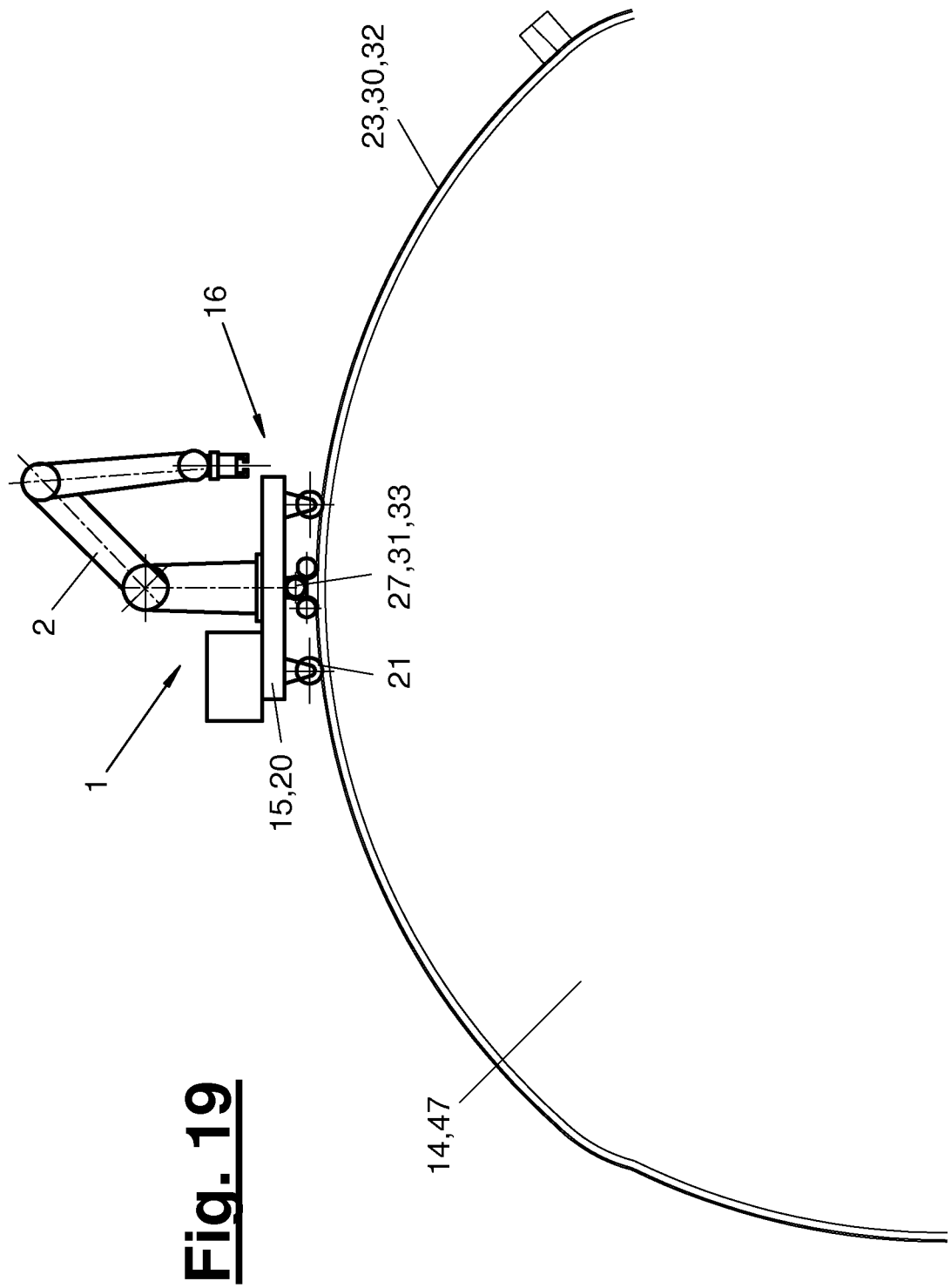

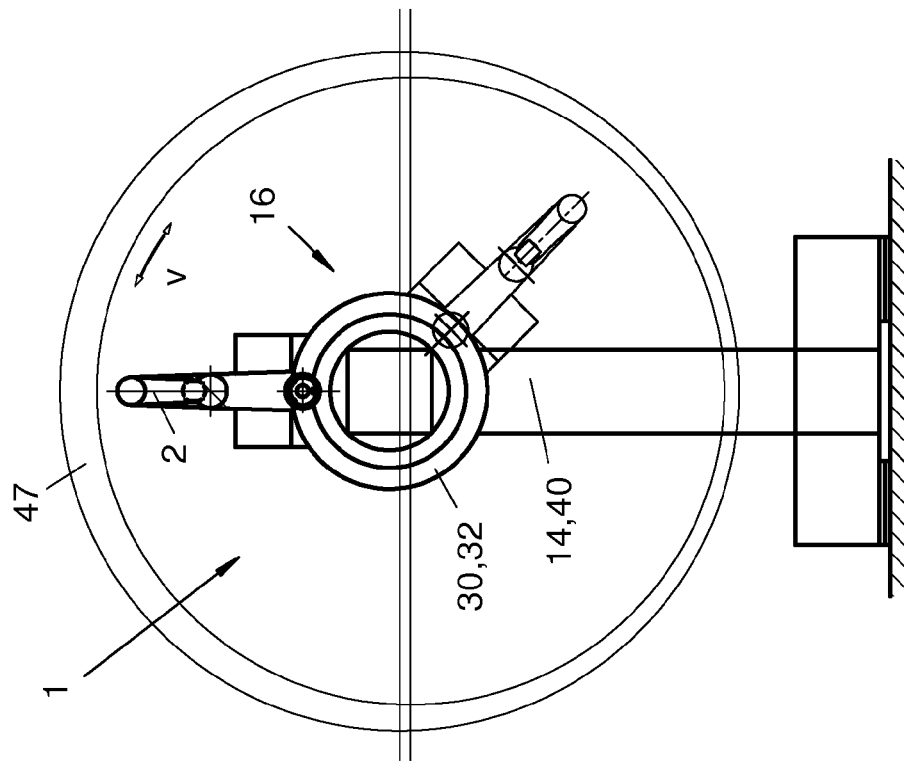
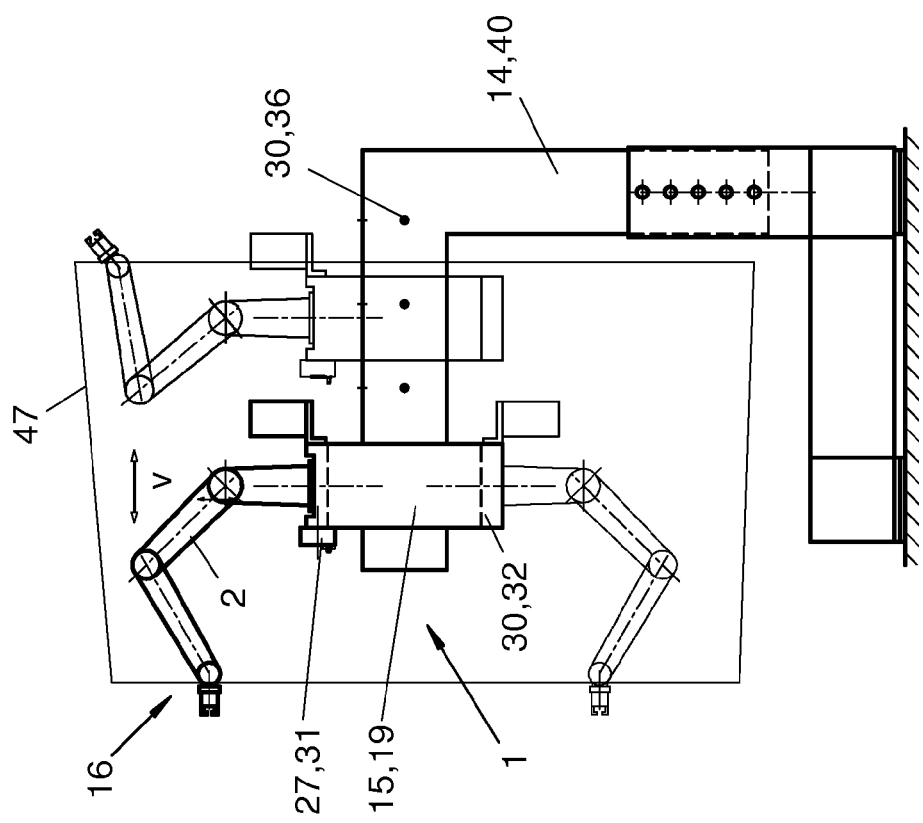

Fig. 22 Fig. 23
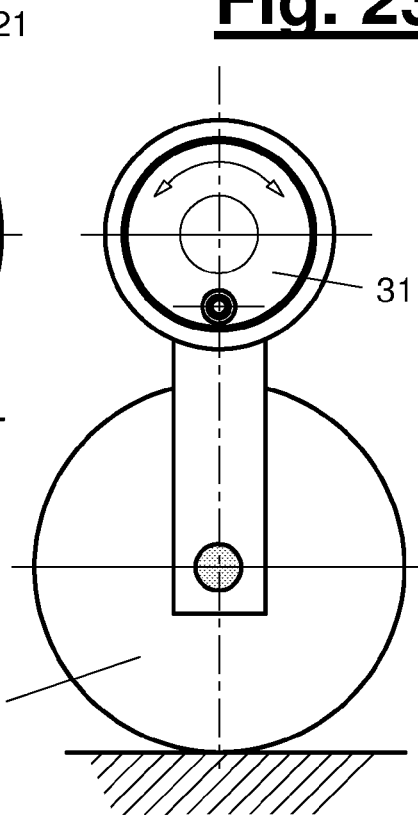
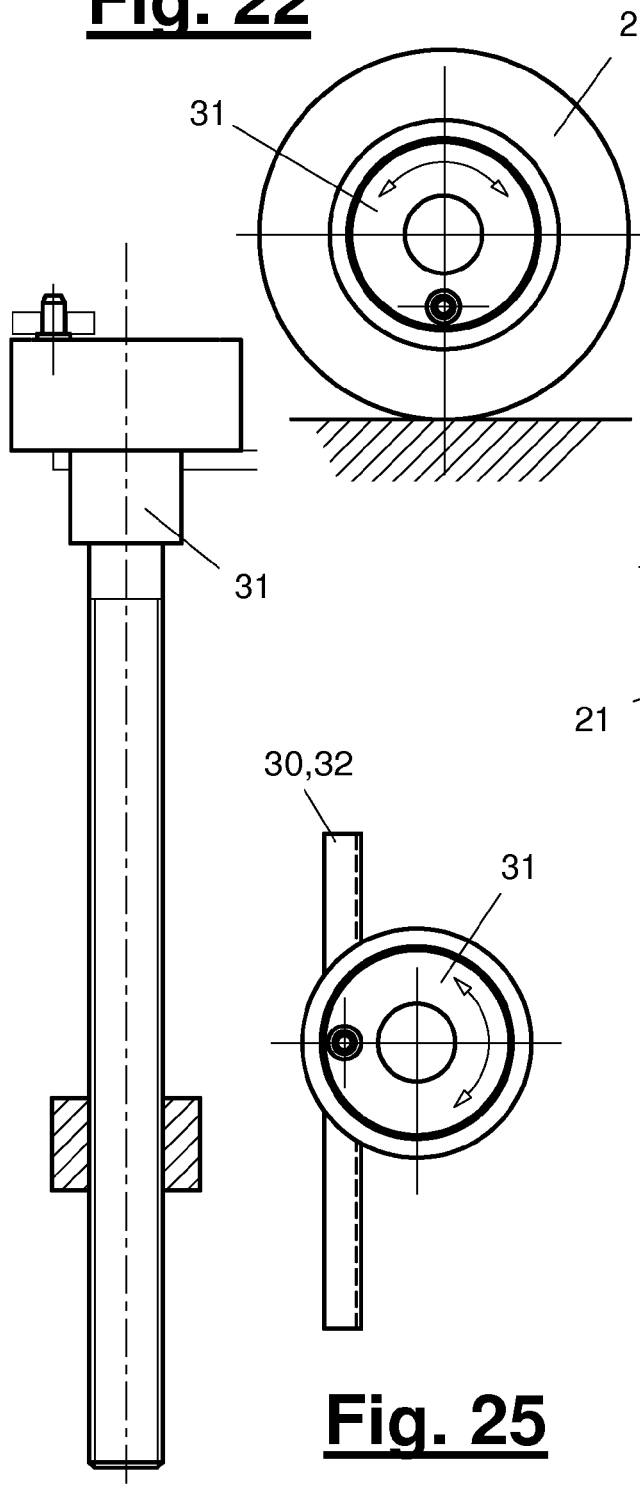
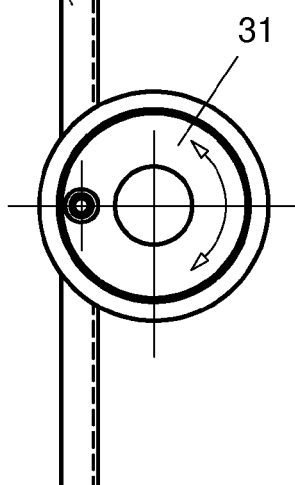
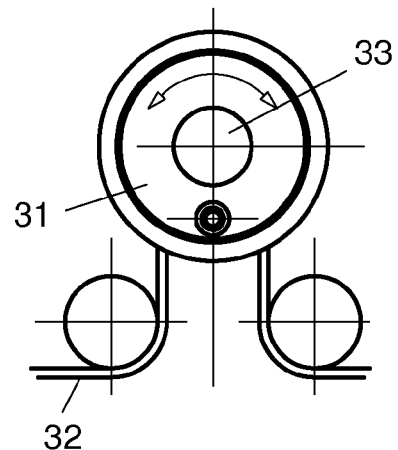
Fig. 25 Fig. 26
Fig. 24

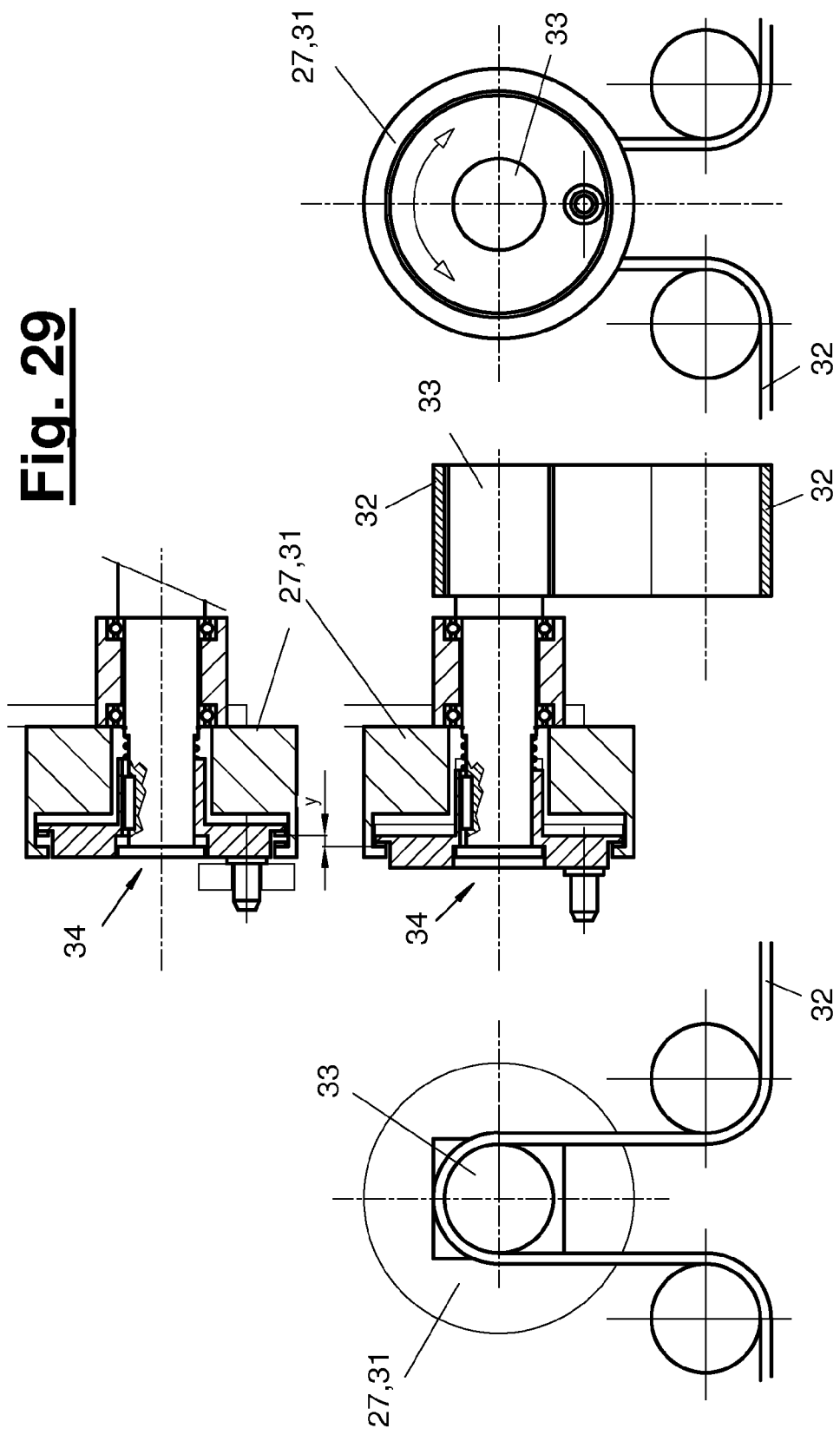

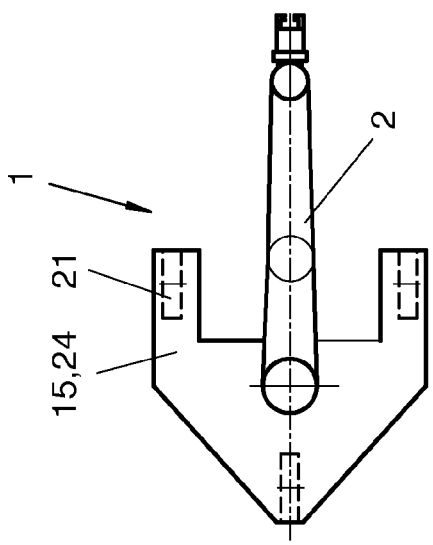
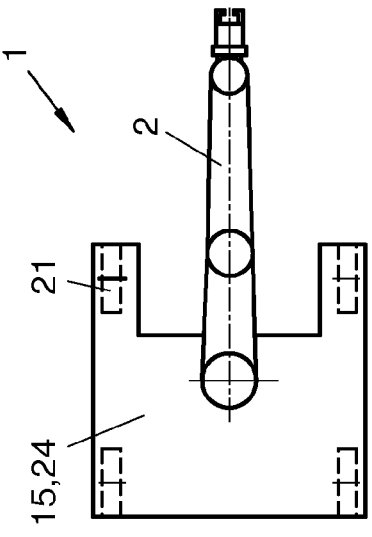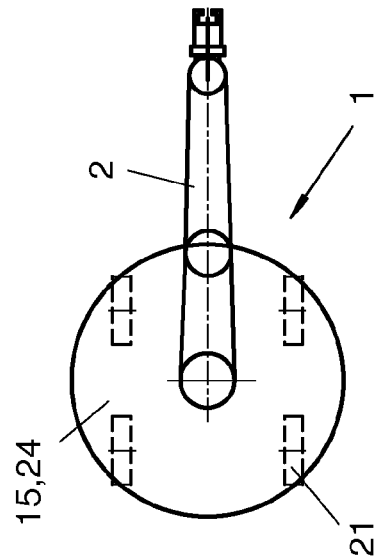
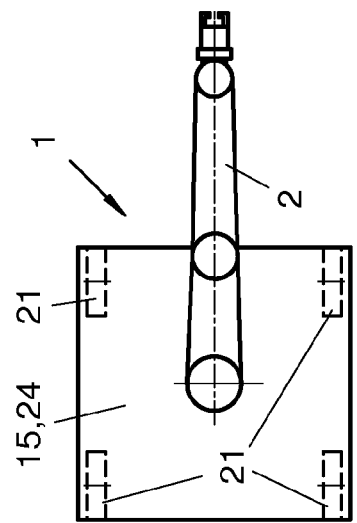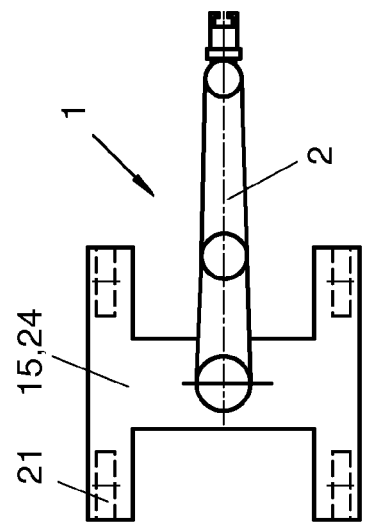

Fig. 42
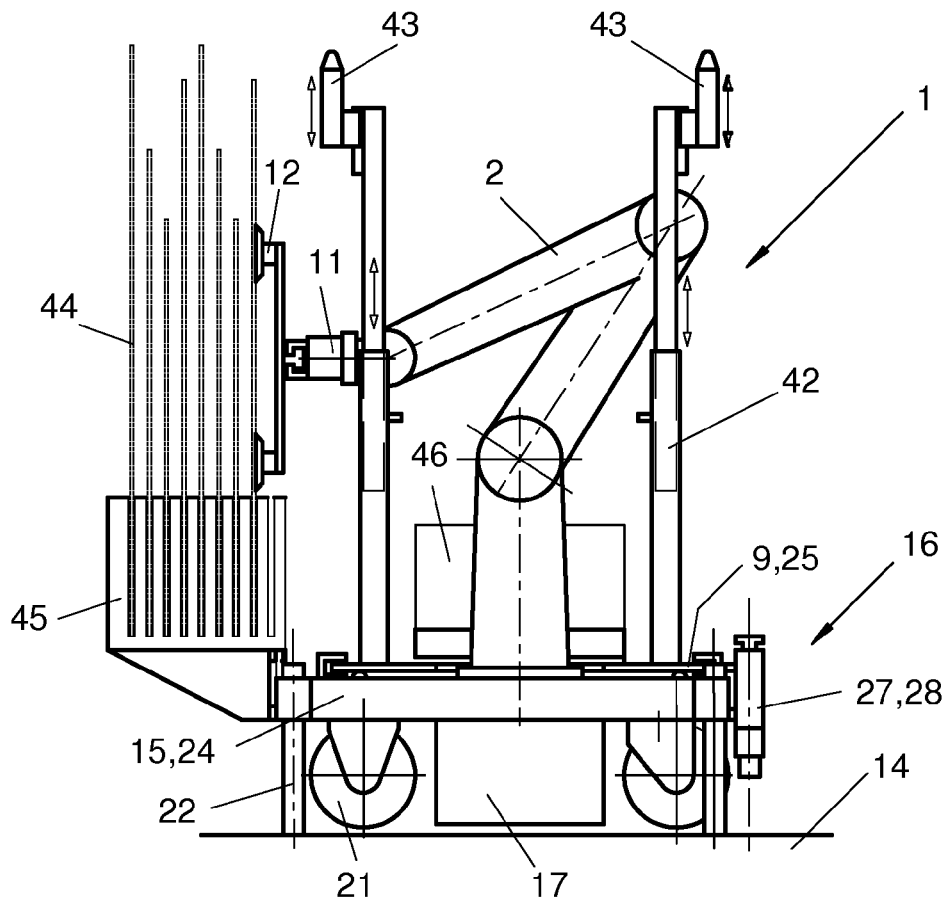
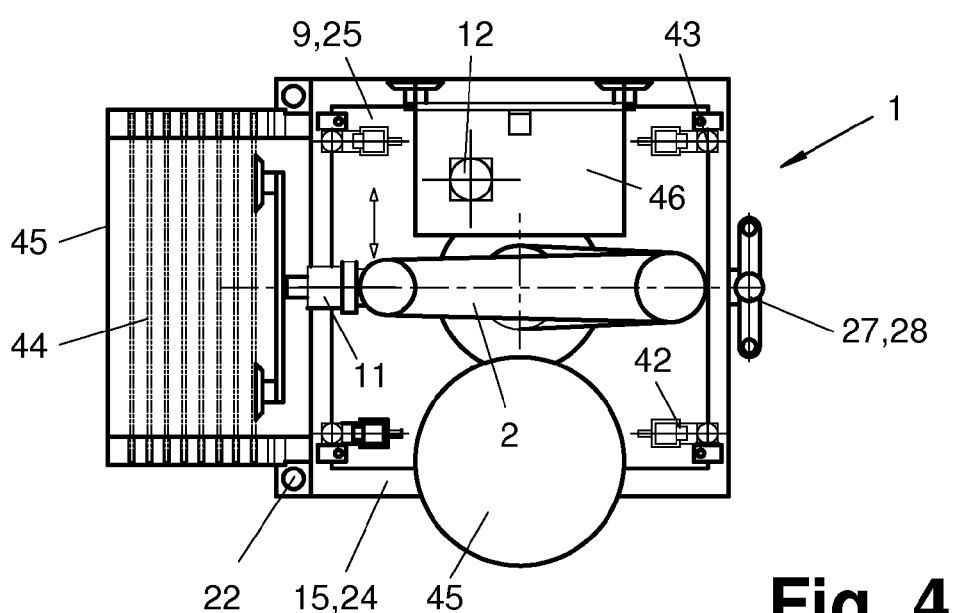
Fig. 43

ROBOT ARRANGEMENT

CROSS REFERENCE TO RELATED APPLICATIONS

This application claims the benefit of priority under 35 U.S.C. §119 of German Utility Model Application 20 2012 100 646.4 filed Feb. 27, 2012, the entire contents of which are incorporated herein by reference.

FIELD OF THE INVENTION

The present invention pertains to a robot arrangement and an operating process having a programmable robot, which has a plurality of links and axes of motion and is arranged on a movable, drivable carrying device.

BACKGROUND OF THE INVENTION

A robot arrangement, in which a movable, programmable robot is arranged on an auxiliary axis, which is designed, e.g., as a rocker or as a linear travel axis, is known from practice. The auxiliary axis has a controllable motor drive of its own and is connected to an electric power supply. Such robots are designed as programmable articulated arm robots with a plurality of position-controlled axes of motion.

SUMMARY OF THE INVENTION

An object of the present invention is to provide an improved robot arrangement and operating technique.

A robot arrangement has a movable, programmable robot, which has a plurality of links and axes of motion and is arranged on a movable, drivable carrying device (carrying means). The robot arrangement has a drive that includes the robot drive, which can be actuated by the robot, for the carrying means.

The robot arrangement and the operating technique according to the invention has the advantage that the robot is autarchic due the robot arrangement being self propelling with the drive of the robot being a part of the drive for the robot arrangement such that the robot can move with its carrying means (carrying device) under its own power. A separate traveling mechanism or pivoting drive for the carrying means is dispensable.

The displacing motions of the carrying means may be multiaxial. This offers the advantage of a very great, hardly limited mobility of the robot with the carrying means thereof. The robot can also reach locations that are accessible with travel axes or axes of motion with difficulty only if at all without a major effort during its displacing motion. The carrying means can also be guided along any desired straight or curved motion paths with the own drive.

The robot may have various designs. Special advantages arise, on the one hand, for a lightweight robot for weight reasons, and the weight and the payload of the robot arrangement can be optimized. In particular, supply with energy, control means or the like may be on board.

Furthermore, it is favorable if the robot has one or more power-controlled or power-regulated axes of motion, which are equipped with a corresponding sensor system. This is favorable, on the one hand, for teaching the robot and the displacing motions thereof with the carrying means. On the other hand, obstacles or other unusual operating states can be recognized and eliminated or bypassed with this sensor system. Thanks to the sensor system, the robot drive and the robot arrangement drive (that includes the robot drive) and the corresponding robot motions can be optimized as well. Such a robot can be positioned especially accurately. In addition, a robot with a sensor system can carry out search functions, e.g., in order to find prepared counterforce supports, e.g., openings. A sensor system is also favorable for positioning purposes.

The robot can be positioned roughly and/or finely with the robot arrangement drive (that includes the robot drive). Rough positioning is possible, e.g., on the way to the target location and in the area surrounding same. Fine positioning is possible on the way to or at the target location on the basis of reference points with reference to the workpiece, e.g., at a template or at a workpiece mount. A sensitive robot can, moreover, position itself roughly opposite a workpiece and seek the workpiece or a reference point on the workpiece from this position and correct the path program being stored in the control for carrying out the process according to the known position of the workpiece or reference point.

The robot arrangement can otherwise be moved on other paths or sections, e.g., on a return path also differently, e.g., by hand or with a tow drive that can be coupled.

The robot arrangement drive (that includes the robot drive) may have drive features actuated by the robot and arranged on the carrying means. Various advantageous design possibilities are available for this. The robot may hold itself temporarily on an external, relatively stationary, especially stationary counterforce support and pull itself to this, push itself away from it or rotate about it. The counterforce support may be based on friction, adhesion, positive locking or the like. As an alternative, the robot may actuate a crank drive or the like arranged on the carrying means. A more accurate position reference can be formed by means of a positive-locking counterforce support. The robot arrangement may otherwise also have other suitable positioning means for locomotion.

The foundation on which the robot with its carrying means is moving may be a floor, a wall or another structural part, e.g., also a workpiece. The carrying means with its kinematics and its support may have different designs.

The robot arrangement according to the invention has many different fields of application. The robot arrangement is able to carry out various tasks and processes at the target location. These may also be complex, in which case a plurality of different tools are used and are possibly handled by the robot with a change coupling. The robot arrangement may also carry with it components, tools and other needed items for carrying out the process, possibly by means of a changeable trailer connected to the carrying means. In addition, a position adjusting means for the robot, with which the robot achieves additional mobility in order to also reach special or difficult workstations, may be present on the carrying means. The robot arrangement may have, moreover, an auxiliary device, which supports the robot during the carrying out of the process and holds in position, e.g., a component previously positioned by the robot at the workpiece, so that the robot can subsequently carry out a joining process. The processes that can be carried out by the robot arrangement may be complex processes comprising a plurality of parts, and the robot can carry out different jobs, e.g., handling, joining or machining of components or workpieces.

Different advantageous embodiments of the present invention are described herein. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 9 is a schematic view showing a variant for forming a counterforce support for a drive means guided by the robot and used for driving purposes;

FIG. 10 is a schematic view showing another variant for forming a counterforce support for a drive means guided by the robot and used for driving purposes;

FIG. 11 is a schematic view showing another variant for forming a counterforce support for a drive means guided by the robot and used for driving purposes;

FIG. 12 is a schematic view showing another variant for forming a counterforce support for a drive means guided by the robot and used for driving purposes;

FIG. 13 is a schematic view showing another variant for forming a counterforce support for a drive means guided by the robot and used for driving purposes;

FIG. 19 is a schematic view showing a variant of the robot arrangement with a crank drive and with another foundation;

FIG. 20 is a side schematic view showing another variant of the robot arrangement with a multiaxially movable carrying means at a column;

FIG. 21 is a top schematic view showing another variant of the robot arrangement with a multiaxially movable carrying means at a column;

FIG. 22 is a schematic view showing a design variant of a crank drive;

FIG. 23 is a schematic view showing another design variant of a crank drive;

FIG. 24 is a schematic view showing another design variant of a crank drive;

FIG. 25 is a schematic view showing another design variant of a crank drive;

FIG. 26 is a schematic view showing another design variant of a crank drive;

FIG. 27 is a schematic view showing another design variant of a crank drive;

FIG. 28 is a schematic view showing another design variant of a crank drive;

FIG. 29 is a schematic view showing another design variant of a crank drive;

FIG. 30 is a schematic view showing another design variant of a crank drive;

FIG. 31 is a schematic view showing one of different design variants of a carrying means of the robot arrangement;

FIG. 32 is a schematic view showing another of different design variants of a carrying means of the robot arrangement;

FIG. 33 is a schematic view showing another of different design variants of a carrying means of the robot arrangement;

FIG. 34 is a schematic view showing another of different design variants of a carrying means of the robot arrangement;

FIG. 35 is a schematic view showing another of different design variants of a carrying means of the robot arrangement.

FIG. 42 is a side schematic view showing a complex robot arrangement with an auxiliary device;

FIG. 43 is a top schematic view showing the complex robot arrangement with an auxiliary device;

DESCRIPTION OF THE PREFERRED EMBODIMENTS

Figure 1:
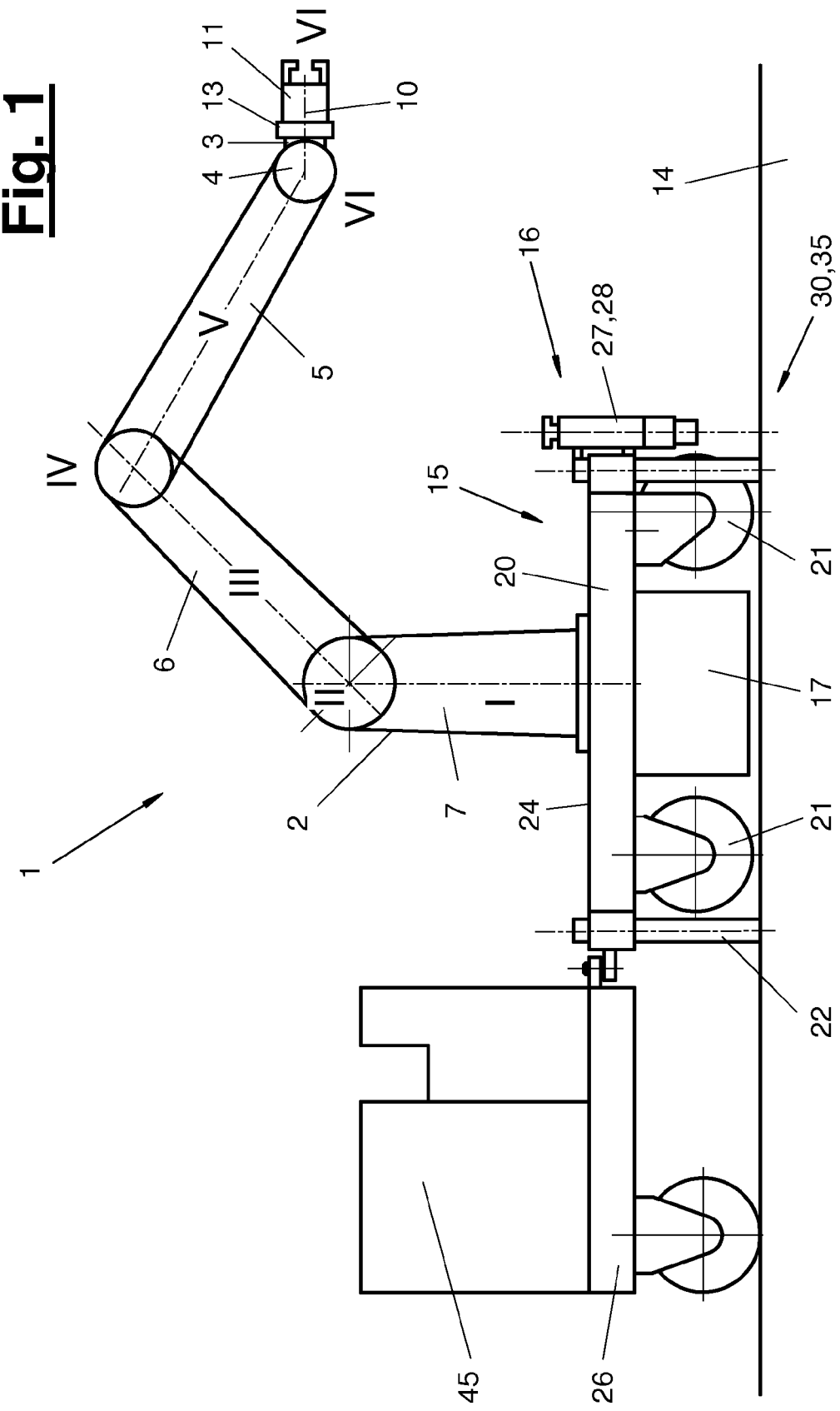
FIG. 1 is a schematic side view showing a robot arrangement with a robot and with a carrying means as well as with a the robot arrangement drive (that includes the robot drive) and with a trailer.

Referring to the drawings in particular, the present invention pertains to a robot arrangement (1) and to a process for operating same.

The robot arrangement (1) has a movable, programmable robot (2), which has a plurality of links (4, 5, 6, 7) movably connected to one another and corresponding axes of motion (I-VII). The robot (2) is arranged on a movable carrying means (a movable carrying device) (15) and can carry out displacing or shifting motions (v) with this. A robot arrangement drive (16), which can be actuated by the robot (2), is provided for this for the carrying means (15). The robot arrangement drive (16) is actuated by a motion of the robot (2), especially by a displacing motion of the end link (4) of the robot.

A drive means (27), which can be actuated by the robot (2) and which is arranged, e.g., at the carrying means (15) and for which different design possibilities will be shown in the exemplary embodiments explained below, is provided for the robot arrangement drive (16). The robot arrangement (1) may have a positioning means (35) for locomotion or the displacing motion of the robot (2) and the carrying means (15) thereof.

Furthermore, an external and relatively stationary, especially stationary counterforce support (30), which interacts with the drive means (27) for transmitting the driving forces exerted by the robot (2) and the driving motions to achieve said displacing motions (v), may be present for the robot arrangement drive (16). The positioning means (35) can interact with the counterforce support (30) or be combined with same. Various variants are likewise shown for the counterforce support (30) and the positioning means (35) in the exemplary embodiments.

The carrying means (15) is arranged movably at or on a foundation (14) and can move in/along one direction or axis or in/along a plurality of directions or axes. These may be rotator and/or translatory axes of motion. Various embodiments are likewise available for the kinematics and the design embodiment of the carrying means (15).

FIG. 1 shows a first embodiment of a robot arrangement (1) with a carrying means (15), which is designed as a carriage (20), which can roll with a plurality or rollers or wheels (21) on a foundation (14), e.g., a flat floor. The wheels (21) may be mounted at least partially pivotably, so that the carriage (20) can travel under the effect of the robot arrangement drive (16) in a straight line or in any desired curves as well as in any desired direction forward or backward and also turn on the spot.

The carrying means (15) has a platform (24), on which the robot (2) and the wheels (21) are mounted. The carrying means (15) has, furthermore, a locking means (22), which may likewise be arranged on the platform (24) and with which the carrying means (15) can be locked. Locking means (22) may have, e.g., height-adjustable support feet. It can be actuated or activated and deactivated by the robot (2). As an alternative, locking means (22) may have a controllable adjusting robot arrangement drive.

A trailer (26), which carries, e.g., a deposit site (45) for components, assembly means or the like and which is moved along during the displacing motions, is detachably and possibly changeably coupled to the carrying means (15) in the exemplary embodiment shown in FIG. 1.

Furthermore, a supply means (17) may be arranged at the carrying means (15) in a suitable location, e.g., hanging under the platform (24). The supply means (17) may contain different components, e.g., an included electric supply means for a robot (2) in the form of a battery or the like. Supply means (17) may also contain a control unit for a robot (2). Supply means (17) may, furthermore, make available further operating materials, e.g., compressed air, hydraulic fluid, coolant or the like.

In a schematic view, FIG. 1 shows a preferred embodiment of the multilink robot (2), which has, e.g., seven axes of motion or robot axes (I-VII) here. The number of axes may also be lower or higher. The links (4, 5, 6, 7) are connected to one another in an articulated manner by means of corresponding bearings and axis drives, forming rotator axes (I-VII). The robot (2) shown has power-controlled or power-regulated robot axes (I-VII) or axis drives along with a control and along with an associated sensor system (not shown) detecting acting loads. The robot (2) may have, moreover, at least one flexible robot axis (I-VII) with active compliance regulation, pure force regulation or with a combination of position and force regulation. The sensor system has, e.g., on some or all axes (I-VII), a torque sensor and is connected to the robot control. Said axes may also have, in addition, a controllable or switchable brake.

The robot (2) has a basic link (7), which is mounted rotatably on the carrying means (15), forming a first robot axis (I). An intermediate link (6) is connected to the basic link (7) via the robot axis (II). The intermediate link (6) may be split and rotatable in itself about a central, longitudinally directed robot axis (III). A second intermediate link (5), which may likewise be split and rotatable in itself, forming a robot axis (V), is connected via another robot axis (IV). The intermediate link (5) is connected via a robot axis (VI) to an end link (4), which is designed, e.g., as a robot hand and has a movable driven element (3), especially one rotating about an axis of rotation (10), and a tool (11), e.g., a controllable gripping tool, is arranged at said driven element. The axis of rotation (10) may form the robot axis (7).

The robot (2) shown may be designed as a lightweight robot, which consists of lightweight materials, e.g., light metal and plastic and also has a small overall size. It may have a low weight and a correspondingly limited load-bearing capacity, which equals, e.g., up to 20 kg.

The robot arrangement drive (16) and its drive means (27), which can be actuated by the robot (2), may have different design and kinematic embodiments.

In the embodiment according to FIG. 1, the drive means (27) is designed as a support means (28), which can be grasped and used by the robot (2) with a tool (11), e.g., a multifunctional gripping tool. The support means (28) is used to establish a force-absorbing contact with an external, relatively stationary counterforce support (30), which is not shown in FIG. 1. In the embodiment shown, the support means (28) is designed, e.g., as socket pin with an upright shaft and with a seat adapted to the gripping tool (11) at the upper end of the shaft. It is held detachably at the carrying means (15) by means of a suitable bracket.

Figure 2:
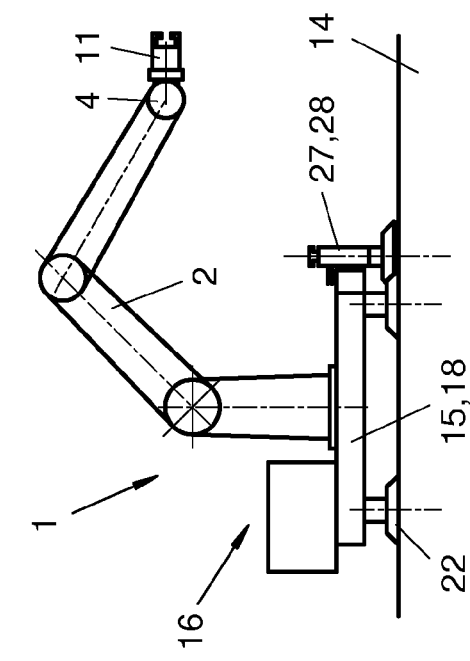
FIG. 2 is a schematic view of a variant of the design of a carrying means and of a robot arrangement drive (that includes the robot drive)

In the variant according to FIG. 2, the carrying means (15) is designed as a sliding means or floating means (18), which is movable at or on a foundation (14) by means of, e.g., an air cushion, a spacing magnetic field or the like along various axes or directions. It can likewise be moved and guided on any desired straight or curved paths by the robot arrangement drive (16). Locking means (22) can be brought about here, e.g., by switching off an air cushion and depositing the carrying means (15). The design of the robot arrangement (1) may otherwise be the same as in FIG. 1, and, in particular, the drive means (27) may be designed as a support means (28).

Figure 3:
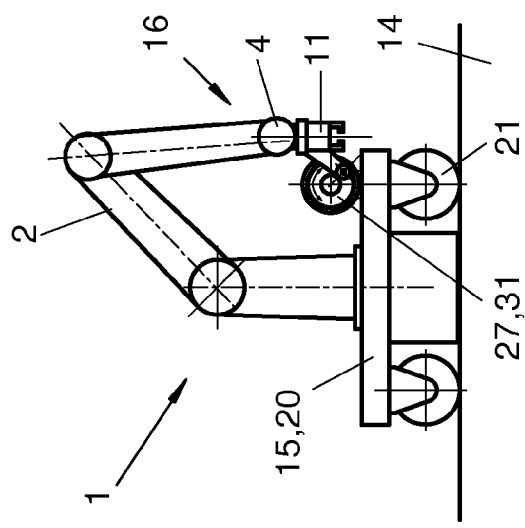
FIG. 3 is a schematic view of a variant of the design of a carrying means and of a robot arrangement drive (that includes the robot drive)

FIG. 3 shows a variant to FIG. 1 with a carriage (20), in which the drive means (27) is designed as a driving drive, e.g., a crank drive (31), which is arranged at the carrying means (15) and is actuated by the robot (2) with a suitable tool (11) to generate a drive motion. This may be, e.g., the above-mentioned gripping tool (11), which has an extension arm or other similar means for detachable meshing with a crank. The robot (2) can grasp the crank and rotate it to generate a driving motion. The driving drive or crank drive (31) acts in this embodiment on the carrying means (15) and the relation thereof to the foundation (14) and rotatingly drives, e.g., one or more wheels (21). A relatively inaccurate or rough positioning of the robot (2) is thus given.

Figure 4:
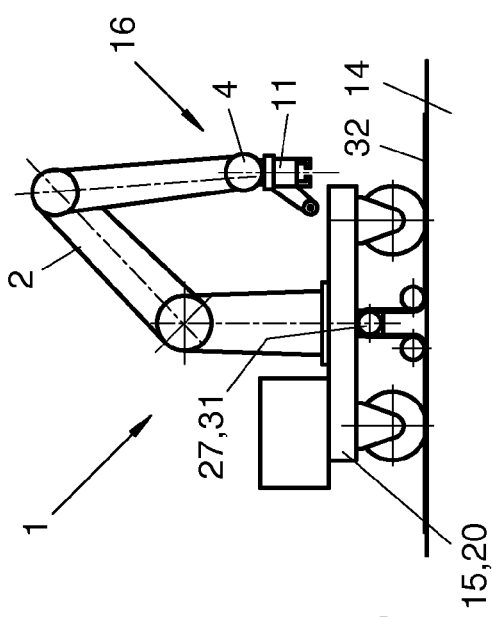
FIG. 4 is a schematic view of a variant of the design of a carrying means and of a robot arrangement drive (that includes the robot drive)

The robot arrangement (1) with a carriage (20) and with another embodiment of a crank drive (31) is shown in the embodiment according to FIG. 4. It interacts with a relatively stationary drive element (32), e.g., a belt arranged at the foundation (14), especially a toothed belt here. This permits more accurate positioning of the robot and the determination of the path of displacement (v). Further details will be explained below.

Figure 5:
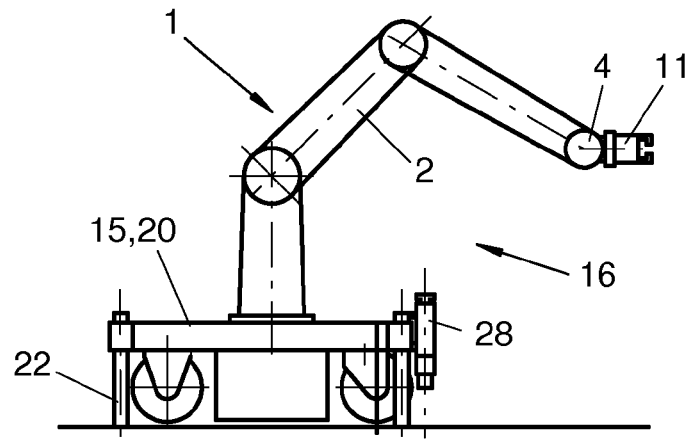
FIG. 5 is a schematic view showing a portion of a motion process of a robot arrangement according to FIG. 1 for carrying out a displacing motion with a robot arrangement drive (that includes the robot drive)
Figure 6:
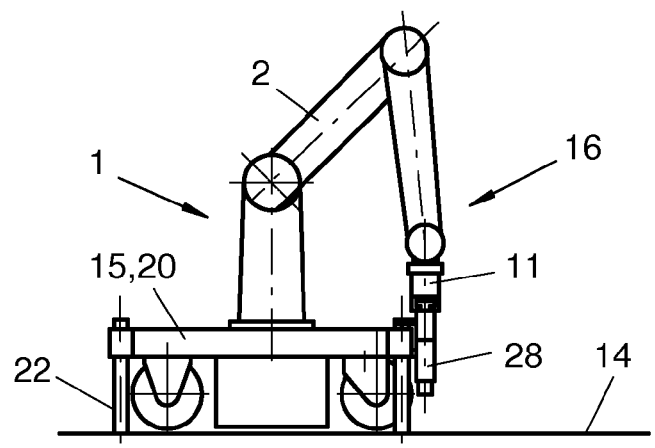
FIG. 6 is a schematic view showing another portion of a motion process of a robot arrangement according to FIG. 1 for carrying out a displacing motion with a robot arrangement drive (that includes the robot drive)
Figure 7:
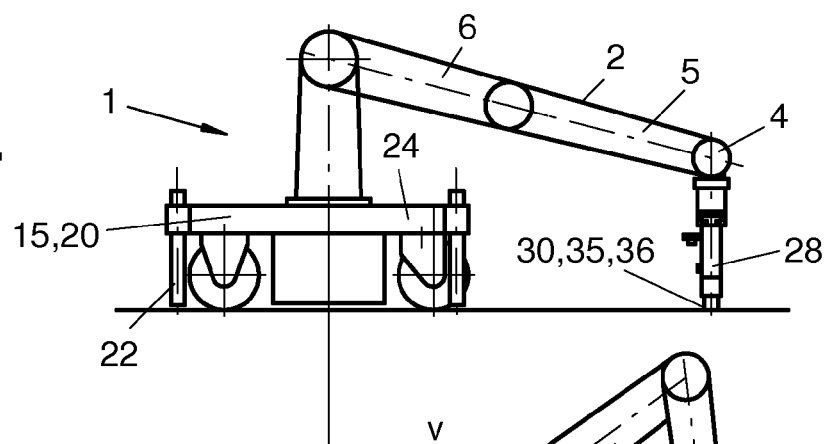
FIG. 7 is a schematic view showing another portion of a motion process of a robot arrangement according to FIG. 1 for carrying out a displacing motion with a robot arrangement drive (that includes the robot drive)
Figure 8:
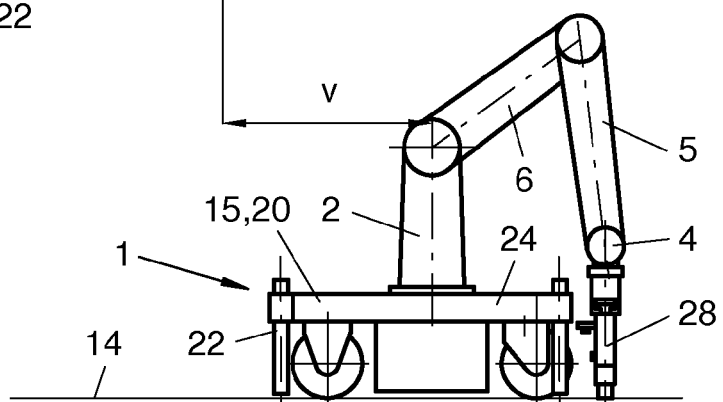
FIG. 8 is a schematic view showing another portion of a motion process of a robot arrangement according to FIG. 1 for carrying out a displacing motion with a robot arrangement drive (that includes the robot drive)

FIGS. 5 through 8 illustrate the motion process of the robot arrangement (1) and of the robot arrangement drive (16) during the performance of a displacing or travel motion. FIG. 5 shows the starting position with the carrying means (5) locked. In the next phase in FIG. 6, robot (2) grips the support means (28) and detaches it from the carrying means (15). The robot then assumes a stretched position according to FIG. 7 and brings the support means (28) with a counterforce support (30) on the foundation (14) into a force-transmitting meshing. This may happen by friction, adhesive or magnetic action, positive locking or the like. In addition, the locking means (22) is released. From the widely extended stretched position with outstretched links (5, 6), the robot (2) then performs a retracting motion of its links (5, 6), while it pulls itself with the carrying means (15) towards the temporarily fixed support means (28). FIG. 8 shows this end position and the path of displacement or travel path (v) covered compared to FIG. 7).

Based on its defined retracting motion, the robot (2) recognizes the path of displacement (v) and its end position according to FIG. 8, especially when the counterforce support (30) has a known position and forms a positioning means (35) or interacts with this. Out of this end position, which may possibly be locked, the robot can then again assume a stretched position according to FIG. 7 and start the motion cycle all over again.

The motions of the robot and the displacing motions (v) generated thereby can be controlled by the robot (2) in terms of direction and size. The robot (2) can also perform rotary motions on the platform (24) for a change in direction and can make changes in direction, especially drive in curves, by interacting with the counterforce support (30).

FIGS. 9 through 13 illustrate different variants of a counterforce support (30) and of a positioning means (35) during the use of a support means (28). FIGS. 9 through 12 show a side view and a tilted bottom view.

In FIG. 9, the counterforce support (30) is formed by friction. The support means (28) has a crossarm at the lower shaft end of the support means (28). The crossarm extends from the shaft end in different directions, here, e.g., to two opposite sides, and carries at its end a friction element each, which is pressed against the foundation (14) and forms the counterforce support (30). The rotated position of the support means (28) is also known and fixed due to the spaced friction elements.

In case of a counterforce support (30) based on friction, the reference point (36), at which the robot (2) positions the drive means or support means (27, 28), is preset by the robot (2), and the position of the point in space on the foundation (14) is defined by the known starting position of the robot (2) and the known robot motion. Accuracy is limited, so that the robot (2) can position itself only roughly during its displacing motion (v) to a target location.

A support means (28) similar to that in FIG. 9 is used in the variant according to FIG. 10, and the friction elements at the ends of the crossarm are replaced here by controllable suction cups, controllable magnets or other similar adhering fixing means. The control and actuation may be performed out of the robot (2). The reference point (36) for the counterforce support (30) is preset by the robot (2) in this case as well.

FIG. 11 shows a variant of the support means (28) and of the counterforce support (30) with a positive-locking interaction. The positioning means (35) is designed as an aligning means (37) here. The support means (28) has at the shaft end, e.g., a pin, which can be inserted into an opening acting as a counterforce support (30) in the foundation (14) with a plug-in fit. The opening forms a reference point (36) with known position on the foundation (14), so that the robot (2) can make its references on this basis and can exactly determine its position as well as the path of displacement (v).

As is illustrated in FIG. 11, the pins and openings may be present as respective pluralities of pins and openings, and the pins my again be located on a crossarm at the lower shaft end. A defined rotated position of the support element (28) meshing with the counterforce support (30) can now be established and an aligning means (37) can be formed. This enhances the accuracy of positioning.

The exemplary embodiment according to FIG. 12 shows a variant of the support means (28) and of the counterforce support (30) as well as of the aligning means (37). In FIG. 11, the openings (30) have, e.g., a rotationally symmetrical, especially cylindrical shape. In the variant according to FIG. 12, an individual opening (30) is provided as a reference point (36), which has a non-rotationally symmetrical and, e.g., elongated shape. A pin, whose shape is correspondingly adapted and is, e.g., elongated, is provided at the lower shaft end of the support means (28).

The foundation (14) in the embodiments according to FIGS. 9 through 12 is, e.g., the floor of a shop or the like. In the variants according to FIGS. 11 and 12, the foundation (14) also forms a reference site (40) with a plurality of reference points (36) with defined and known position. The foundation (14) may also be designed, as an alternative, as a surface of a workpiece.

In the variant according to FIG. 13, the reference site (40) is, e.g., an upright wall to form the counterforce support (30). One or more reference points (36) according to FIGS. 11 and 12 may be present here along with aligning means (37). The counterforce support (30) is formed by openings in the wall.

In the exemplary embodiments according to FIGS. 11, 12 and 13, the counterforce supports (30) and the reference points (36) also form a positioning means (35) at the same time, with which the robot (2) can orient and position itself for performing the displacing motion (v).

Figure 14:
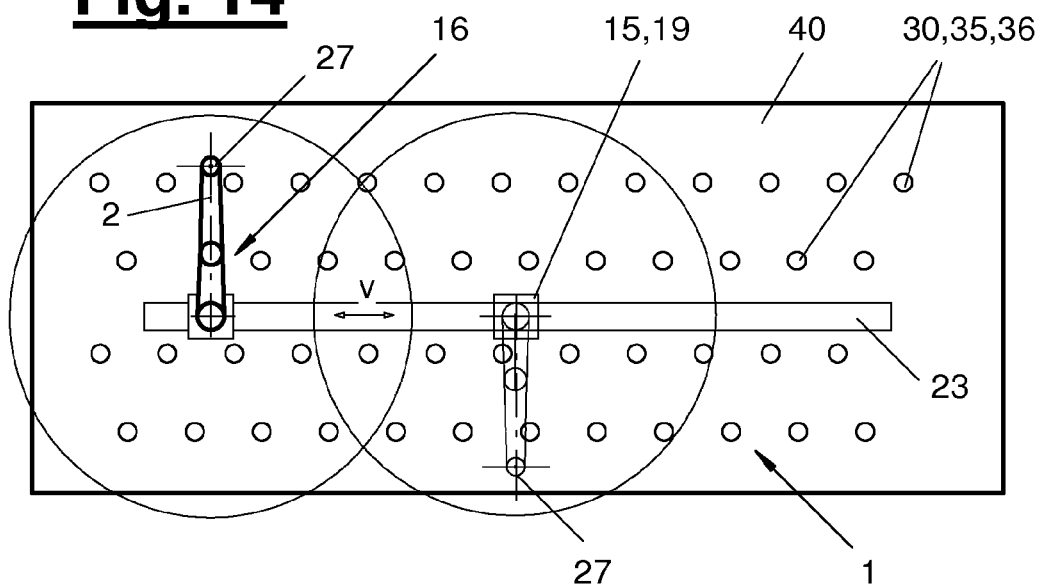
FIG. 14 is a schematic view showing a variant of the robot arrangement and the possibilities of motion thereof as well as of the counterforce support.

FIG. 14 shows a variant of the robot arrangement (1), which was already mentioned above, and of the robot arrangement drive (16). The carrying means (15) is designed as a sliding carriage (19) here and interacts with a relatively stationary, especially stationary guide (23), e.g., a guide track. Due to the robot arrangement drive (16), the robot (2) can move along the guide (23) in a controlled manner. FIG. 14 also illustrates the multiple arrangement of reference points

(36) at a reference site (40), which is formed here, e.g., by a template, which is arranged on a workpiece with location reference. The reference site (40) may also be defined directly by a workpiece. The reference points (36) with the counterforce support (30) being formed here or with the positioning means (35) are arranged in the known position and distribution, and they are arranged, e.g., in a regular grid.

The reference points (36) in the form of, e.g., round openings may also have an additional function as a positioning and guiding means for a processing tool (12) guided by the robot (2), especially a drilling tool, and have a defined location reference to the workpiece. FIG. 14 shows different motion positions that the robot (2) can assume during a displacing motion (v) with the robot arrangement drive (16). In a variant of the embodiment shown, a plurality of robots (2) with sliding carriages (19) may also be arranged at the guide (23).

Figure 15:
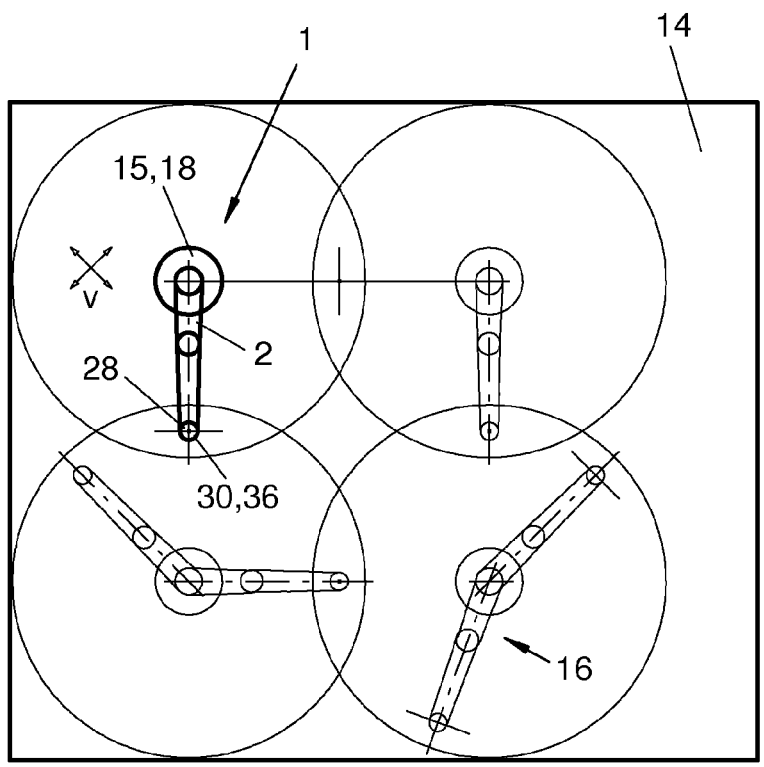
FIG. 15 is a schematic view showing another variant of the robot arrangement and the possibilities of motion thereof as well as of the counterforce support.

FIG. 15 shows a variant for multiaxial displacing motions (v) in any desired direction of a robot arrangement (1), wherein the carrying means (15) is designed here, e.g., as a sliding means or floating means (18). It may be designed, e.g., as a sliding plate with a switchable magnet or suction element or with an air cushion with suction element for fixation and possibly combined with stripping brushes. The foundation (14) is formed, e.g., by the floor or a table plate or tooling plate. The foundation (14) may possibly also be designed in the manner described in connection with FIG. 14 as a reference site (40) as a template with reference points (36) in a positive-locking meshing. The support means (28) and the reference points (36) or the counterforce support (30) may be designed in the above-described manner according to FIG. 9 or 10. FIG. 15 shows as an example the different displacing motions or positions that the robot (2) with its carrying means (15) along with the robot arrangement drive (16) can perform and assume.

Figure 16:
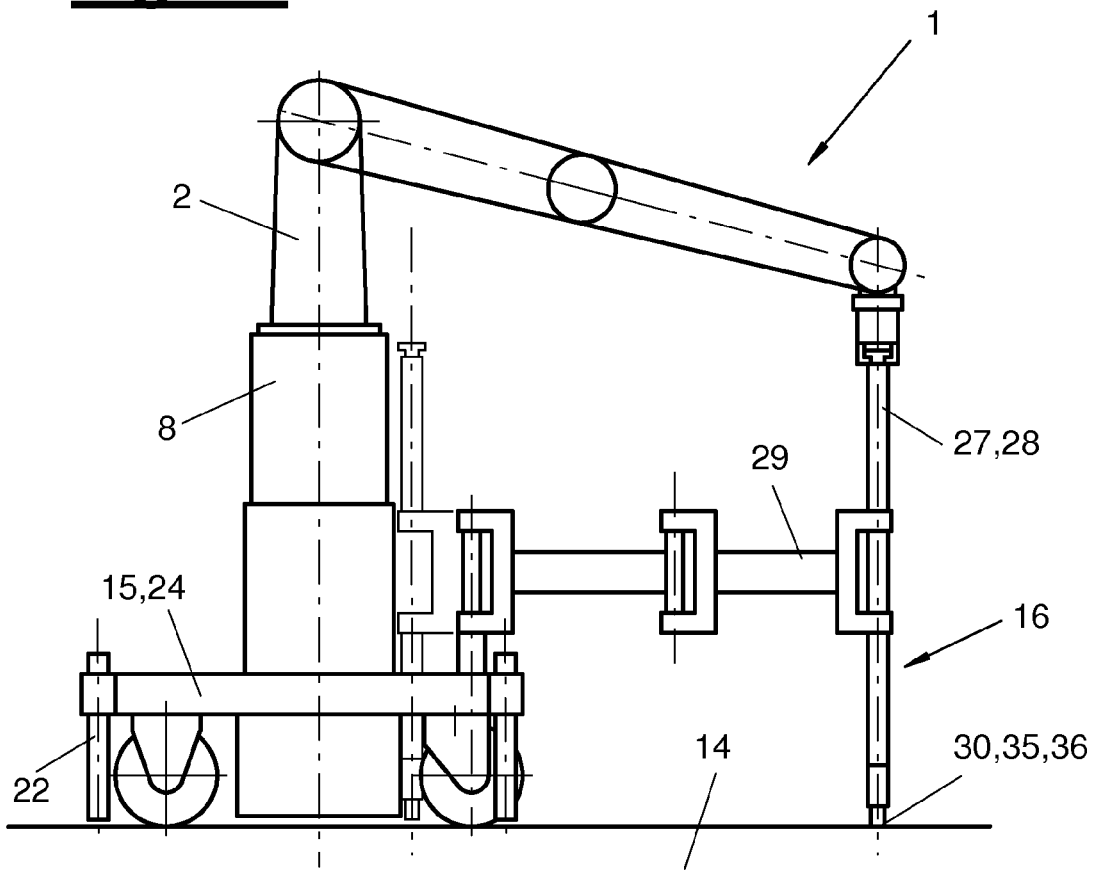
FIG. 16 is a side schematic view showing a variant of the robot arrangement with a drive means mounted and guided on the carrying means.
Figure 17:
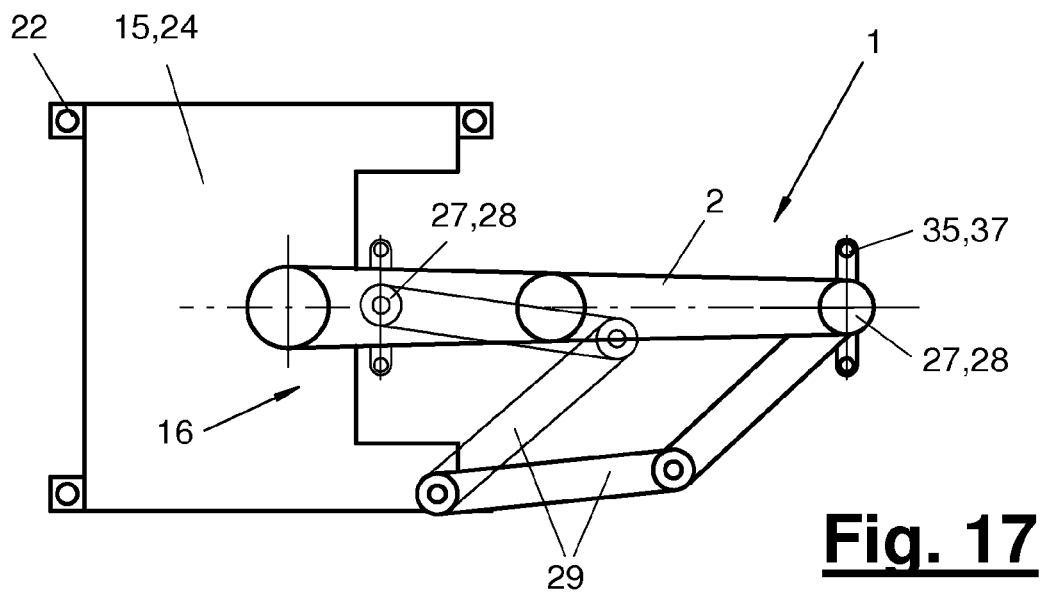
FIG. 17 is a top schematic view showing the variant of the robot arrangement with a drive means mounted and guided on the carrying means.

FIGS. 16 and 17 show a variant of the robot arrangement (1) from FIG. 1. The robot (2) is arranged here on a base (8) with a distance from the platform (24). The support means (28) has a correspondingly greater length of its shaft. To better absorb the forces and torques generated on the foundation (14) during the interaction with the counterforce support (30) and to relieve the robot (2), the support means (28) is arranged at a guide (29) in this exemplary embodiment. This guide (29) is in turn fastened and mounted at the carrying means (15), especially at the platform (24). The guide (29) may have a plurality of arms and articulations, which impart a great and multiaxial mobility to the support means (28). The guide (29) is connected to the support means (28) permanently or optionally rotatably and meshes with the middle area thereof, wherein the forces of reaction or reaction moments generated during the drive motion are absorbed by the guide (29) and the release mechanism of the robot (2). In an inoperative position, the support means (28) may be received, with the guide retracted, near the base (8) in a recess of the platform (24).

Figure 18:
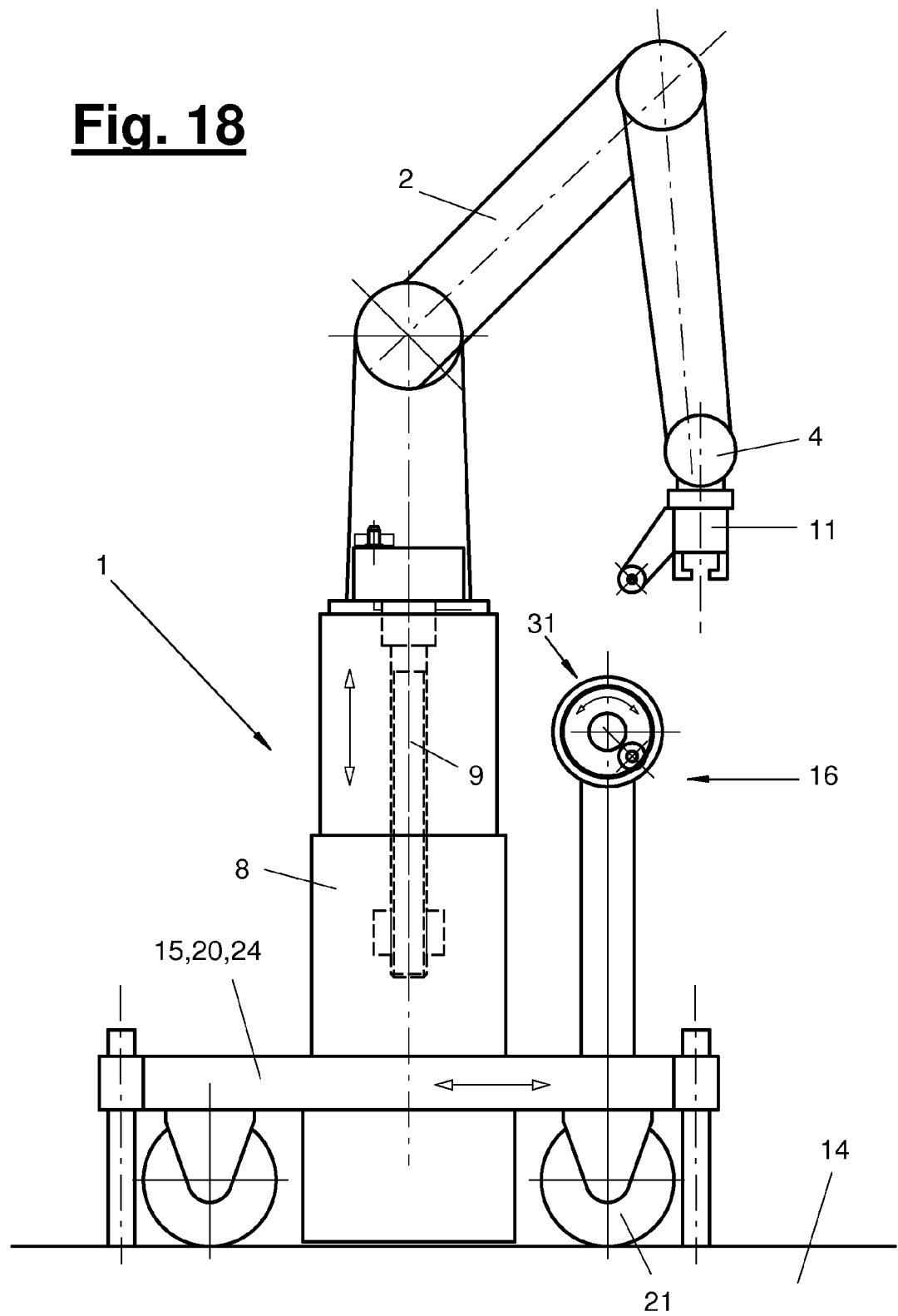
FIG. 18 is a side schematic view showing a robot arrangement with a crank drive and a position adjusting means.

FIG. 18 shows a variant of the robot arrangement (1), in which the robot (2) has a position adjusting means (9) for a displacement relative to the platform (24). This is, e.g., a height adjusting means with a spindle and with a crank drive, which the robot (2) can actuate itself in order to bring itself into the desired position in height in a controlled manner and reference to the position. The robot (2) may again be arranged on a base (8) here.

FIG. 18 also shows a correspondingly adapted crank drive (31), whose crank is arranged at a correspondingly high column in the working area of the robot (2). At least one of the wheels (21), which is rolling on a foundation (14), is driven here by means of the crank. The direction can be preset, e.g., by means of a guide, not shown.

FIG. 19 shows a variant of the robot arrangement (1) on another foundation (14), which is designed here, e.g., as a workpiece (47). This may be, e.g., the fuselage of an airplane or the hull of a ship. The workpiece (47) may have a contour of any desired shape and especially of any desired curvature. The carrying means (15) may be of any desired and suitable design, e.g., it may a carriage (20) with wheels or rollers (21), which roll on the surface of the workpiece.

The drive means (27) is designed again as a crank drive (31), which interacts in this case with a relatively stationary drive element (32), here, e.g., a belt, especially toothed belt, which is arranged on the surface of the workpiece. The belt (30) may be tightened and also forms at the same time a guide (23) for the carrying means (15). The belt or toothed belt (32) is guided at the carrying means (15) via a driving wheel (33), especially a pinion, of the crank drive (31) located there. The robot (2) converts the driving wheel (33) motion into rotary motion with a crank, not shown.

FIGS. 20 and 21 show another variant of the robot arrangement (1) in tilted views. The foundation (14) or the reference site (40) is designed as a frame or column here, which has a basic part, an upright and possibly height-adjustable support arm and a horizontal extension arm, on which the carrying means (15) with a robot (2) is arranged. The carrying means (15) is designed as a sliding carriage (19) here, which can perform multiaxial displacing motions (v). These may be a rotary motion about the, e.g., central axis of the extension arm and a linear travel motion along the extension arm. The sliding carriage (19) may have for this a rotating means with its base supported on the extension arm such that the base rotates in unison and with a turntable ring, on which the robot (2) is arranged. The drive means (27) may be designed as a crank drive (31) with a drive element (32) designed, e.g., as a toothed ring at the base and with a pinion (33). The robot (2) can again operate the crank for the crank drive (31) independently here.

For shifting motions (v) along the extension arm with the sliding carriage (19), the robot (2) can use another drive means (27), e.g., the above-described support means (28), wherein the counterforce support (30) is formed for this by openings and reference points (36) on the extension arm. Due to this robot arrangement drive (16), the robot (2) can move to a workpiece (47), which has, e.g., a tubular shape and surrounds the robot (2) and the extension arm on the outside. Such an arrangement is suitable, e.g., for carrying out handling or machining processes or the like within the fuselage of an airplane or within the hull of a ship.

FIGS. 22 through 30 show different variants for the design of a crank drive (31). FIG. 22 shows a crank drive (31) with a rotatable crank, which is arranged directly at a wheel (21) of a carrying means (15) with the same axis and drives same directly. In FIG. 23, the crank drive (23) is arranged with a vertical offset over the driven wheel (21), and a transmission may be inserted in-between for power transmission. FIG. 24 shows a crank drive (30) with a threaded spindle, by means of which a tightened spindle nut is moved axially for the purpose of the robot arrangement drive (16) or possibly also for position adjustment (9). FIG. 25 shows the crank drive (31) with a drive element (32), e.g., a toothed rack or worm shaft, with which a counterforce support (30) can be formed.

In the variant according to FIG. 26, a crank drive (31) is shown combined with a belt drive, wherein the relatively stationary drive element (32), forming a counterforce support (30), here a belt or toothed belt, is guided in an guide by means of tensioning and deflecting rollers over a driving wheel or pinion (33) with driving meshing. The driving wheel (33) is set into rotation by means of a crank of the crank drive (31) by the robot (2). Such an arrangement can be used in the embodiment according to FIG. 19.

FIGS. 27 through 30 show such a crank and belt drive arrangement in different other views. In addition, FIGS. 29 and 30 show here a securing means (34), which locks the crank drive (31) during non-actuation by the robot (2). For example, the robot (2) must press in for this the crank disk arranged displaceably on the crank pin in the axial direction and now release radial serrations in relation to a surrounding, relatively stationary bearing housing. A resetting spring, which again pushes the crank disk into said toothed meshing when the crank is released by the robot (2), is tensioned at the same time. The crank disk is guided for this on the crank pin axially displaceably and such that it rotates in unison.

FIGS. 31 through 35 show different variants in the design of a platform (24) and of a carrying means (15). Different arrangements of wheels (21) are shown here as well. Corresponding designs may also be used for other sliding or floating means with air cushions, magnets, suction units or the like. The platforms may have a prismatic or round shape and outer contour. Openings for forming a C or H shape are also possible here. Furthermore, a platform (24) may have a conical shape at one site or at a plurality of sites. The number of wheels or sliding elements may equal, e.g., three or four.

Figure 36:
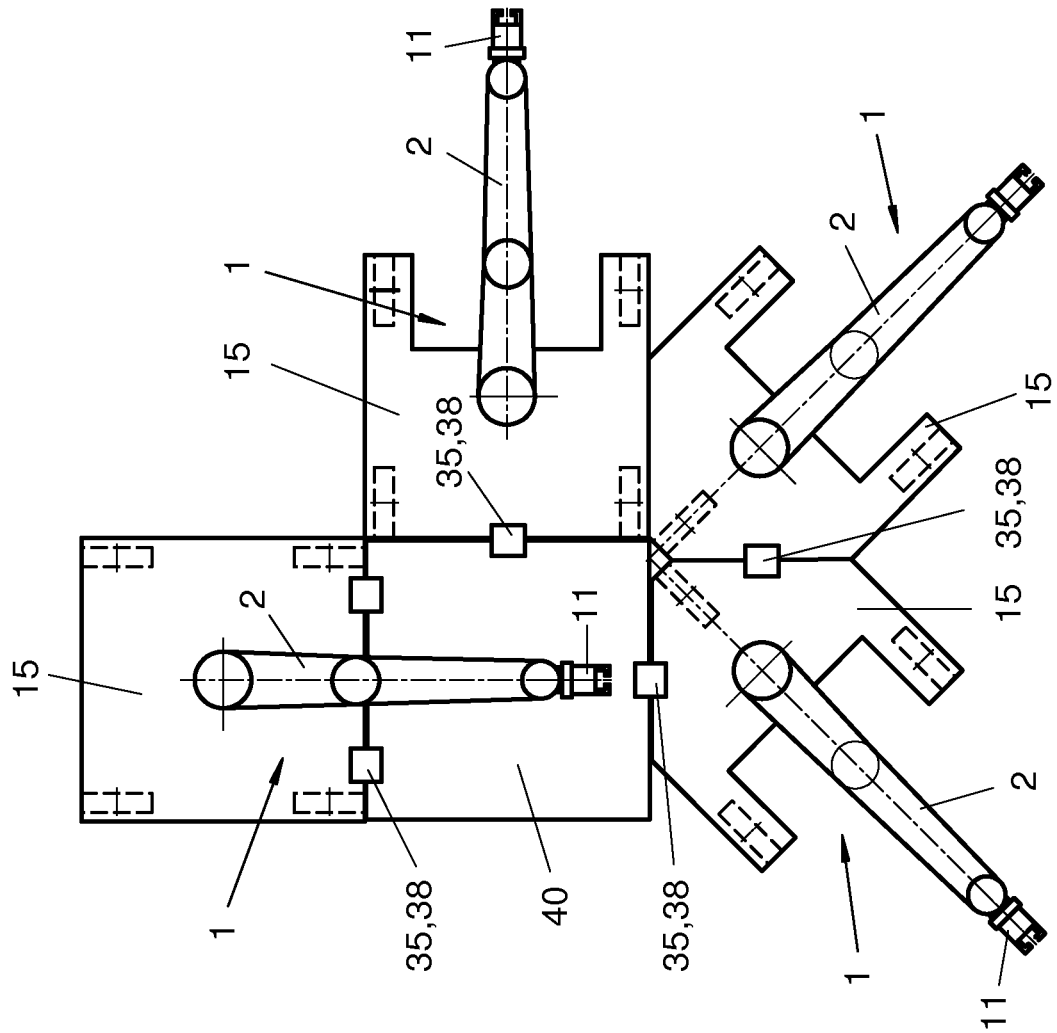
FIG. 36 is a schematic view showing an exemplary embodiment with the interaction of a plurality of robot arrangements.
Figure 37:
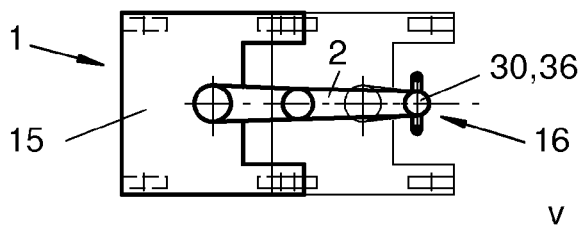
FIG. 37 is a schematic view showing one of different possibilities of motion and displacing motions of a robot arrangement.

FIG. 36 shows a case of application in which a plurality of robot arrangements (1) of the above-described type interact for carrying out a process and position themselves for this at a work location, e.g., a workpiece, a table or another work station. The robot arrangements (1) have the above-described self propelling drives for the robot arrangement drive (16), with which the robot moves to the target location and reference site and positions itself in the process more or less accurately or roughly or finely.

To achieve fine positioning in a docking position at the reference site (40) or even in a mutual docking position for the process, a correspondingly accurate positioning means (35) may be provided. This may designed, e.g., as a plotting means (38) for the positive-locking and detachable connection between a carrying means (15) and the reference site (40) or even of carrying means (15) among each other. With their sensitivity and the robot arrangement drive (26), the robots (1) can seek the corresponding plotting means (38) in a tactile manner and establish the positive-locking meshing for positioning and alignment.

Due to the above-mentioned triangular or at least partially conical shape of a carrying means (15), especially of the platform (24) thereof, which is shown in FIG. 35, close positioning of the robot arrangements (1) and of the robots (2) thereof on the periphery of the reference site (40) or among others is possible. As a result, the robots (2) can all machine or handle the workpiece located at the reference site (40) or perform other processes thereon from a preset, exact position.

Figure 38:
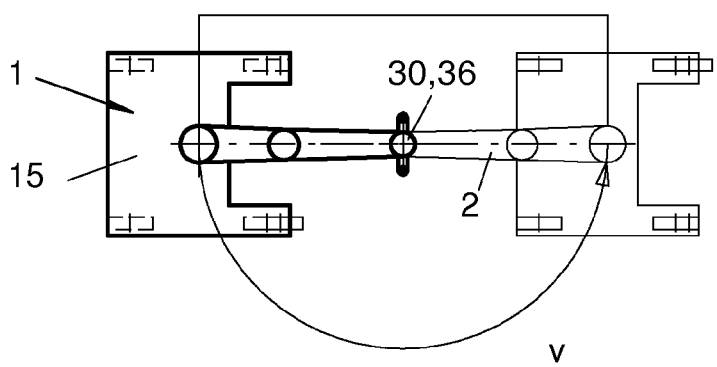
FIG. 38 is a schematic view showing another of different possibilities of motion and displacing motions of a robot arrangement.

FIGS. 37 through 41 schematically show different exemplary superimposed or shifting motions (v), which a robot arrangement (1) with the robot arrangement drive (16) can carry out. This is a linear motion in FIG. 37, as it is also shown in FIGS. 5 through 8. FIG. 38 shows a linear travel motion with increased stroke, in which case the robot (2) is supported at first pullingly and then pushingly at a counterforce support (30) or a reference point (36). The robot (2) now performs a 180° turn on the platform (24).

Figure 39:
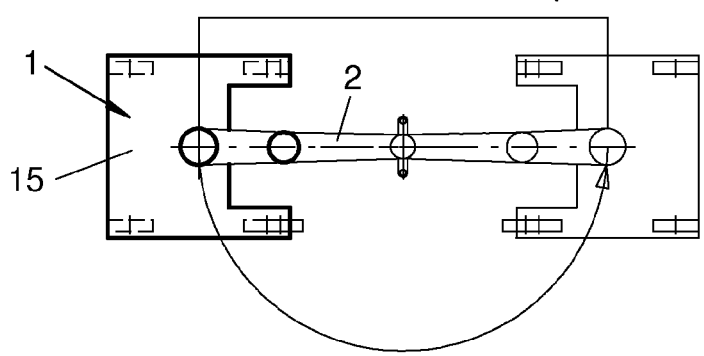
FIG. 39 is a schematic view showing another of different possibilities of motion and displacing motions of a robot arrangement.
Figure 40:
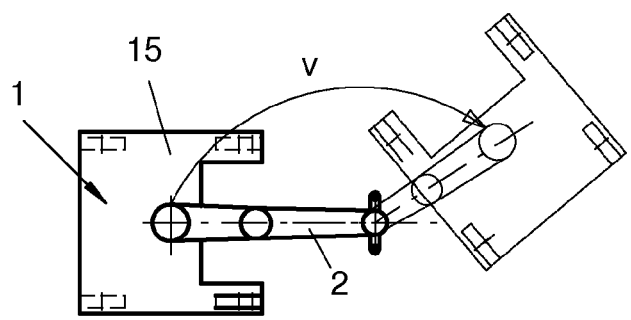
FIG. 40 is a schematic view showing another of different possibilities of motion and displacing motions of a robot arrangement.

The motion and drive process in FIG. 39 is similar, but the carrying means (15) performs, in turn, a 180° turn. FIG. 40 shows another rotated position and pivoting motion (v). A curved shifting motion (v) with pivoting motion of the carrying means (15) and of the robot (2) is likewise shown in the variant of FIG. 41.

Figure 41:
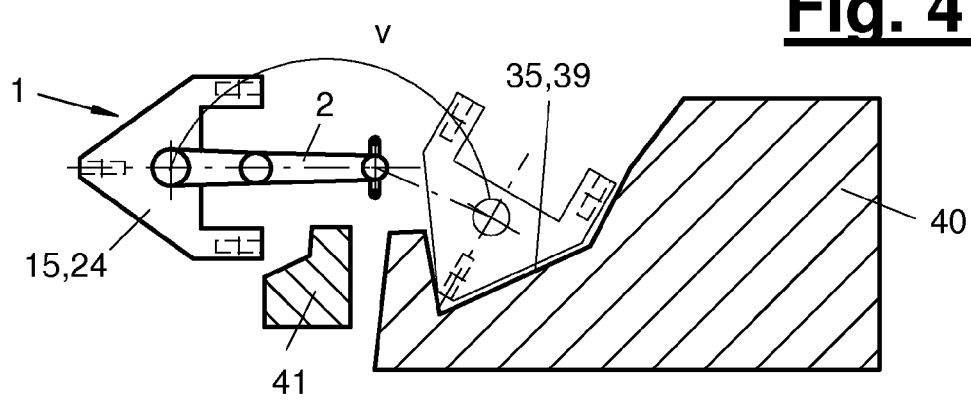
FIG. 41 is a schematic view showing another of different possibilities of motion and displacing motions of a robot arrangement.

FIG. 41 shows, in addition, a variant of a positioning means (35) at a reference site (40). The positioning means (35) is designed here as a positive-locking, contoured mount (39) at the reference site (40), wherein the shape of the mount interacts with the outer contour of the carrying means (15), especially of the platform (24) thereof, in a positive-locking manner. The exemplary embodiment illustrates, besides, how a robot arrangement (1) with a curved shifting motion (v) can bypass an obstacle (41).

The robot arrangement (1) with the robot being self propelling—the drive of the robot (2) forms a part of the robot arrangement drive (16) is shown in different variants in the above-described exemplary embodiments. The robot (2) can perform any desired processes at the workstation or at the site of use. It can use for this the gripping tool (11) already used for the robot arrangement drive (16). In such a case, the robot (2) performs primarily handling tasks. The tool (11) may also be of a multifunctional design and may also have, besides gripping elements, further functional and machining elements, e.g., the extension arm shown with gripping means for actuating the crank. Other functional elements may be joining elements or the like. In the embodiments shown, the tool (11) may be arranged permanently at the end link (4), especially at the driven element (3) thereof.

As an alternative, a change coupling (13) indicated in FIG. 1, which makes automatic tool change possible, may be arranged at the end link (4) or driven element (3). As a result, the robot (2) can expand the scope of processes it can perform as a result.

FIGS. 42 through 46 illustrate a complex robot arrangement (1) outfitted to a higher level, in which the robot (2) can perform a plurality of different processes. The robot arrangement drive (16) may be designed corresponding to the previous exemplary embodiments. The variant according to FIGS. 42 through 46 illustrates, besides, further design variants of the robot arrangement (1).

The robot (2) may have, e.g., a different and possibly additional type of position adjustment (9). It may be used for lateral adjustment on the platform surface and have a lockable floating frame (25). The robot (2) can be brought here into a variable position in relation to the workpiece (47) with the carrying means (15) positioned and locked and adjust itself in relation to a reference site located there. The robot (2) or an adjusting means can ensure locking of the floating frame (25).

The exemplary embodiment illustrates, besides, a variant in tool design. The robot (2) carries here the gripping tool (11) described in the previous exemplary embodiments. This can possibly also grip and carry additional tools (12), besides a support means (28). These additional tools may be, e.g., handling and gripping tools for holding and guiding components (44) or machining tools or joining tools or the like. The gripping tool (11) is designed in such a case as a universal gripper, which has various gripping functions and can also function as a coupling means for picking up and operating additional tools. A deposit site (46) for one or more tools (12) may be present at the carrying means (15). In a variant of the embodiment shown, the above-mentioned change coupling may be present, with which the robot (2) can pick up the tools (12) directly and change them automatically.

At least one additional, possibly detachable deposit site (45), which can be used, e.g., to receive the components (44) shown in the form of sheet metals, may be arranged at the carrying means (15). A deposit site (45) may also receive small parts such as screws or the like.

In addition, an auxiliary device (42), which is movable and controllable and which can interact with the robot (2), is arranged on the carrying means (15) in the embodiment shown. The auxiliary device (42) can be used to support the process and can be used, e.g., to move and/or position a component (44). The auxiliary device (42) has for this, e.g., a frame with a plurality of possibly height-adjustable columns, at the ends of which holding or pressing-on elements (43) or other functional elements may be arranged, which possibly have an adjusting axis of their own and are likewise controllable. The auxiliary device (42) can be arranged together with the robot (2) on a floating frame (25) to secure a position reference.

Figure 46:
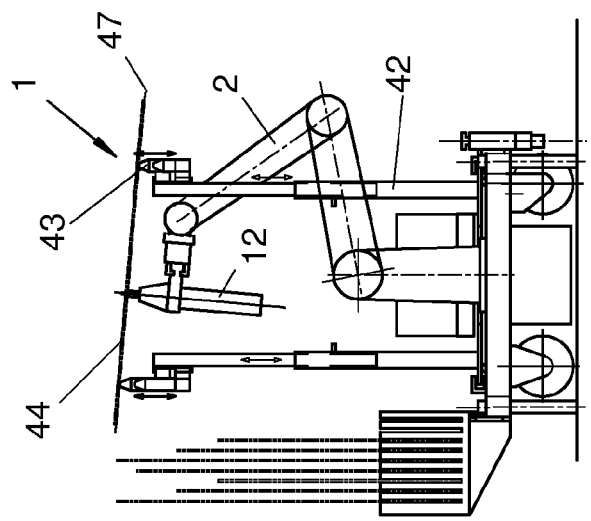
FIG. 46 is a schematic view showing another of different operating positions of the robot arrangement from FIGS. 42 and 43.
Figure 45:
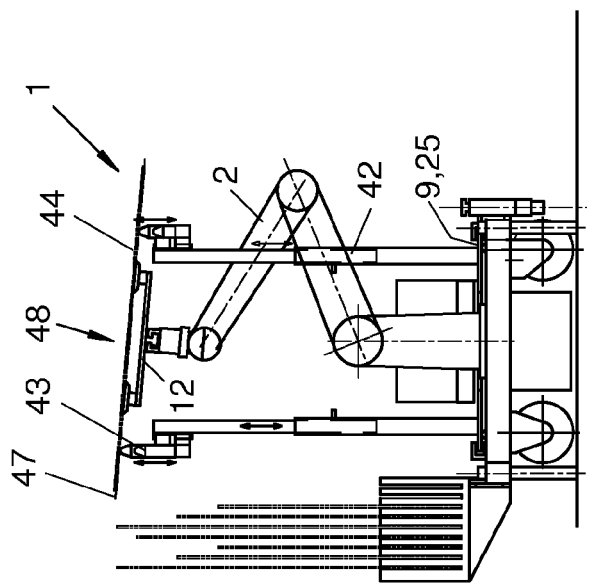
FIG. 45 is a schematic view showing another of different operating positions of the robot arrangement from FIGS. 42 and 43.
Figure 44:
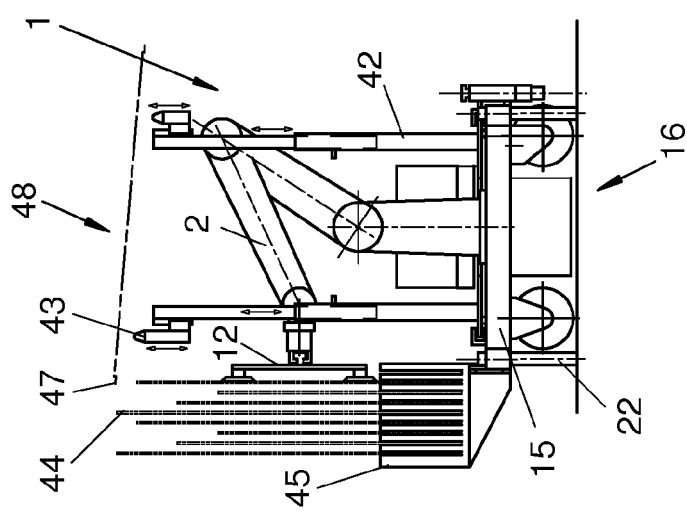
FIG. 44 is a schematic view showing one of different operating positions of the robot arrangement from FIGS. 42 and 43.

FIGS. 44 through 46 exemplarily illustrate the course of a function and process of such a robot arrangement (1), where a component (44) in the form of a cover shall be fastened at the opening (48) of a workpiece (47), e.g., of the fuselage of an airplane.

In the first step according to FIG. 44, the robot arrangement (1) with the robot arrangement drive (16) is moved to the intended site of use at the workpiece (47) and positioned as well as locked there. The robot (2) removes a component (44) from the deposit site (45) with its gripping tool (12). Then, according to FIG. 45, it moves the component (44) into the correct mounting position at the workpiece (47) and to the opening (48) thereof. The subsequently activated auxiliary device (42) holds the component (44) in this position and presses it against the workpiece (47). The robot (2) can then detach its handling tool (12) from the component (44) and replace it with another tool (12), e.g., a joining tool, with which it subsequently joins, e.g., rivets or screws, the component (44) being held in position according to FIG. 46 by the auxiliary device (42) to the workpiece (47).

The floating frame (25) may be useful during this positioning. For example, the auxiliary device (42) can at first move out after receiving the component (44) from the robot (2) and position itself at the workpiece (47) on the basis of suitable reference points by means of the floating frame (25), and the robot (2) can also be brought into position at the same time. The floating frame (25) can then be locked. In a variant, it is possible for the fine positioning to be performed by means of the floating frame (25) by the robot (2), while the auxiliary device (42) is included.

The robot arrangement drive (16) can again be used for the path of the robot arrangement (1) to the next intended site of use, e.g., assembly site, at the same workpiece (47). Complex multipart processes, especially handling, assembly or machining processes, at a plurality of sites of a workpiece (47) or at a provided multiple arrangement of workpieces (47) can also be automated in this manner.

For longer paths, e.g., for return into the starting position at a workpiece (47), which may have been changed, the carrying means (15) can also be moved by a worker by hand or with a coupled tow drive.

Various variants of the exemplary embodiments shown and described are possible.

A plurality of robots (2) may be arranged on a carrying means (15), and one or more robots may be used for the robot arrangement drive (16). A robot (2) may have any other desired and suitable design and may have position-controlled axes. The number, design and combination of the robot axes can be selected as desired, and these axes, in particular, may be designed as translatory and/or rotator axes. The robot arrangement (1) may have, furthermore, another type of carrying supplies. The operating materials, especially power and signal currents, fluids and the like, can be carried out by means of a trailing line, sliding contacts or path contacts or the like during the displacing motion (v). Furthermore, docking at different supply sites is possible.

In a variation of the exemplary embodiments shown, the carrying means (15) may be arranged hanging on a ceiling or on a wall in case of a suitable design and moved along here. A tool (11, 12) may be movable and controllable, and the actuation and the supply with operating materials takes place from the robot (2). As an alternative, supply with operating materials may take place from the outside.

The drive means (27) may likewise be modified. When the robot (2) is temporarily holding on to a counterforce support (30), it can use for this, e.g., its gripping tool (11) and grip external, relatively stationary reference points (36) in the form of projections. A driving drive (31) may be designed as a ratchet drive with oscillating driving motion, e.g., similarly to a gang car, or in another suitable manner.

Referencing of the robot (2) at a workpiece for carrying out a process there can be performed in the above-described manner by touch using the integrated sensor system and the sensitivity of the robot (2). As an alternative or in addition, an external sensor system, e.g., a camera measuring system or vision system, may be used in conjunction with the robot control.

A preferred area of use of the robot arrangement (1) is in vehicle manufacturing plants, especially in body shell plants or assembly. Other possibilities of use are in logistic systems, e.g., in high-bay warehouses, in supermarkets or the like. A robot (2) provided with sensitivity also offers here advantages concerning safety against accidents and collisions.

Furthermore, the exemplary embodiments shown and their features may be combined and replaced with one another as desired in order to form other modified embodiments.

While specific embodiments of the invention have been shown and described in detail to illustrate the application of the principles of the invention, it will be understood that the invention may be embodied otherwise without departing from such principles.

APPENDIX

LIST OF REFERENCE NUMBERS

| | |
|---|---|
| 1 | Robot arrangement |
| 2 | Robot, lightweight robot, movable |
| 3 | Driven element, driven flange, rotating flange |
| 4 | Link, end link, hand |
| 5 | Link, intermediate link |
| 6 | Link, intermediate link |
| 7 | Link, basic link |
| 8 | Base |
| 9 | Adjustment, position adjustment, height adjustment |
| 10 | Axis of rotation |
| 11 | Tool, gripping tool |
| 12 | Tool, machining tool |
| 13 | Change coupling |
| 14 | Foundation, floor, workpiece |
| 15 | Carrying device |
| 16 | Drive of its own |
| 17 | Supply means |
| 18 | Sliding means, floating means |
| 19 | Sliding carriage |
| 20 | Carriage |
| 21 | Roller, wheel |
| 22 | Locking means |
| 23 | Guide |
| 24 | Platform |
| 25 | Floating frame, lockable |
| 26 | Trailer |
| 27 | Drive means |
| 28 | Support means, contact element |

APPENDIX-continued

LIST OF REFERENCE NUMBERS

| | |
|---|---|
| 29 | Guide, extension arm |
| 30 | Counterforce support, opening |
| 31 | Driving drive, crank drive, crank drive |
| 32 | Drive element, belt, toothed belt, toothed ring |
| 33 | Driving wheel, pinion |
| 34 | Securing means |
| 35 | Positioning means |
| 36 | Reference point |
| 37 | Aligning means |
| 38 | Plotting means |
| 39 | Mount, positive-locking |
| 40 | Reference site, workpiece e, workstation |
| 41 | Obstacle |
| 42 | Auxiliary device |
| 43 | Pressing-on element |
| 44 | Component |
| 45 | Deposit site, component deposit site |
| 46 | Deposit site, tool deposit site |
| 47 | Workpiece |
| 48 | Opening |
| v | Shifting motion, path of displacement |
| I-VII | Robot axis |

What is claimed is:

1. A robot system comprising:
a movable, programmable robot comprising a plurality of links and a plurality of axes of motion and including a robot drive for movement of the links relative to each other;
a movable, steerable and drivable carrying device supporting the robot for movement of the robot multidirectionally relative to a support or foundation, the carrying device comprising a plurality of freely rotatable wheels and at least one freely swivelable and freely rotatable wheel allowing the carrying device to move multidirectionally;
a robot arrangement drive comprising the robot drive, a support device, that can be gripped by the robot, and one or more of the plurality of links whereby the robot arrangement is self propelling and the robot arrangement is driven by a motion of the robot including by a displacing motion of an end link of the robot;
an external counterforce support at the support or foundation or reference site, wherein the robot causes the support device to mesh with the external counterforce support at the support or foundation or reference site to move or position the carrying device; and
a robot control configured to control the movement of the links relative to each other to actuate the robot arrangement drive for moving the carrying device and the robot, wherein the counterforce support has a plurality of stationary openings or pins disposed in a two dimensional pattern over a region of the counterforce support, corresponding to positioned reference points, whereby the support device meshes with the openings or pins of the external counterforce support by at least a portion of the support device extending into one of the openings, or engaging one of the pins.

2. A robot system in accordance with claim 1, wherein the carrying device has one or more rotator and/or translatory axes of motion and is steerable by the robot arrangement drive.

3. A robot system in accordance with claim 1, wherein the least one freely swivelable, freely rotatable wheel and at least one of the plurality of freely rotatable wheels comprise swivel wheels.

4. A robot system in accordance with claim 1, wherein the counterforce supports and the reference points form a positioning device to aid positioning during locomotion and orientation of the robot.

5. A robot system in accordance with claim 4, wherein the positioning device comprises a relatively stationary, positive-locking mount for the carrying device.

6. A robot system in accordance with claim 1, wherein the carrying device has a locking device to fix a position of the carrying device.

7. A robot system in accordance with claim 1, wherein the carrying device has a position adjusting device with one or more axes of adjustment, the position adjusting device being actuatable by the robot.

8. A robot system in accordance with claim 7, wherein the position adjusting device comprises a height adjusting device and/or as a lateral adjusting device with a lockable floating frame.

9. A robot system in accordance with claim 1, further comprising a deposit site for components and/or tools arranged at the carrying device or at a trailer connected to the carrying device.

10. A robot system in accordance with claim 1, further comprising a controlled auxiliary device interacting with the robot, the controlled auxiliary device being arranged at the carrying device for moving and/or positioning a component.

11. A robot system in accordance with claim 1, wherein the robot has at least one of a universal gripper tool and a change coupling for replaceable tools.

12. A robot system in accordance with claim 1, wherein the robot has one or more power-controlled or power-regulated robot axes with an associated sensor system detecting acting loads.

13. A robot system in accordance with claim 1, wherein the robot has at least one flexible robot axis with active compliance regulation, pure force regulation or with a combination of position and force regulation.

* * * * *